(12) United States Patent
Suzuki et al.

(10) Patent No.: US 8,258,240 B2
(45) Date of Patent: Sep. 4, 2012

(54) PRESSURE-SENSITIVE ADHESIVE COMPOSITION AND USE THEREOF

(75) Inventors: Toshihide Suzuki, Ibaraki (JP); Kenichi Yamamoto, Ibaraki (JP); Yutaka Tosaki, Ibaraki (JP); Akiko Takahashi, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 246 days.

(21) Appl. No.: 12/578,758

(22) Filed: Oct. 14, 2009

(65) Prior Publication Data

US 2010/0099317 A1    Apr. 22, 2010

(30) Foreign Application Priority Data

Oct. 16, 2008    (JP) .................................. 2008-267298

(51) Int. Cl.
*C08L 33/08* (2006.01)
*C08L 33/10* (2006.01)
*C09J 133/08* (2006.01)
*C09J 133/10* (2006.01)

(52) U.S. Cl. ........ 525/228; 525/191; 525/221; 525/222; 525/227; 524/502; 524/515; 524/522; 524/523; 428/343; 428/354; 428/355 R; 428/355 EN; 428/355 AC

(58) Field of Classification Search .................. 525/191, 525/216, 221, 222, 227, 228; 428/343, 354, 428/355 R, 355 EN, 355 AC; 524/500, 501, 524/502, 515, 522, 523

See application file for complete search history.

(56) References Cited

U.S. PATENT DOCUMENTS

| | | | |
|---|---|---|---|
| 5,492,950 A * | 2/1996 | Brown et al. | 524/166 |
| 5,851,662 A | 12/1998 | Suzuki et al. | |
| 2007/0218276 A1 * | 9/2007 | Hiramatsu et al. | 428/354 |

FOREIGN PATENT DOCUMENTS

| | | |
|---|---|---|
| EP | 0 913 443 A1 | 5/1999 |
| EP | 1 273 643 A1 | 1/2003 |
| EP | 1 491 604 A1 | 12/2004 |
| EP | 1 574 557 A1 | 9/2005 |
| EP | 2 100 933 A1 | 9/2009 |
| JP | 08-209086 A | 8/1996 |
| JP | 08-218040 A | 8/1996 |
| JP | 08-333550 A | 12/1996 |

(Continued)

OTHER PUBLICATIONS

European Patent Office, Office Action in European Application No. 09 173 084.6 (Feb. 4, 2010).

(Continued)

*Primary Examiner* — James J Seidleck
*Assistant Examiner* — Vu A Nguyen
(74) *Attorney, Agent, or Firm* — Leydig, Voit and Mayer, Ltd.

(57) ABSTRACT

The present invention provides a water-dispersed acrylic PSA composition suitable for forming a PSA sheet. The PSA composition contains 0.5 to 15 parts by weight of an acrylic copolymer (polymer H) with a Tg of 30° C. to 120° C. in relation to 100 parts by weight of an acrylic copolymer (polymer L) with a Tg of −70° C. to −50° C. The polymer L is obtained by polymerization of a monomer starting material comprising 60 wt % or more of an alkyl (meth)acrylate with a $C_8$-$C_{12}$ alkyl group; and 0.5 to 10 wt % of a radical polymerizable monomer with a carboxyl group.

19 Claims, 2 Drawing Sheets

FOREIGN PATENT DOCUMENTS

| | | | |
|---|---|---|---|
| JP | 10-279907 | A | 10/1998 |
| JP | 11-241053 | A | 9/1999 |
| JP | 2000-265140 | A | 9/2000 |
| JP | 2001-107007 | A | 4/2001 |
| JP | 2001-335767 | A | 12/2001 |
| JP | 2002-167557 | A | 6/2002 |
| JP | 2002-294209 | A | 10/2002 |
| JP | 2003-193006 | A | 7/2003 |
| JP | 2006-143856 | A1 | 1/2006 |
| JP | 2006-056936 | A | 3/2006 |

OTHER PUBLICATIONS

European Patent Office, Office Action in European Application No. 09 173 084.6 (Feb. 18, 2011).

Chinese Patent Office, First Notice of the Opinion on Examination in Chinese Application No. 200910205160.9 (May 17, 2012).

\* cited by examiner

[FIG. 1]
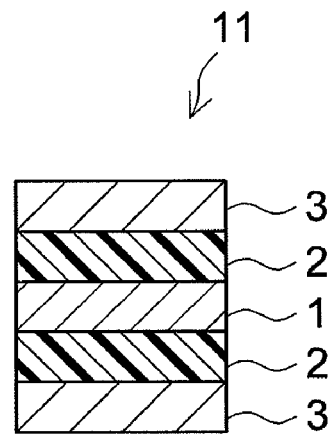
[FIG. 2]
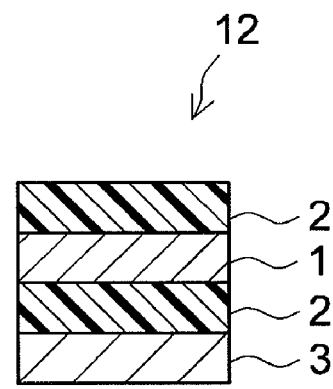
[FIG. 3]
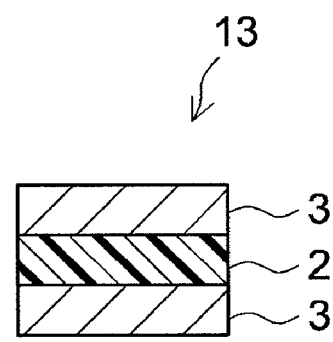

[FIG. 4]
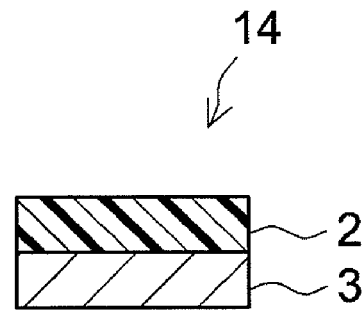
[FIG. 5]
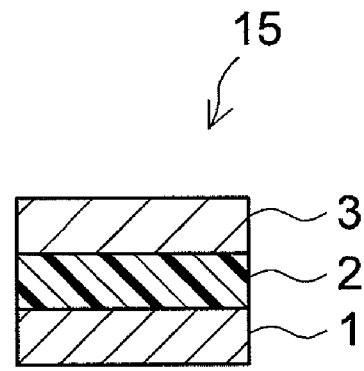
[FIG. 6]
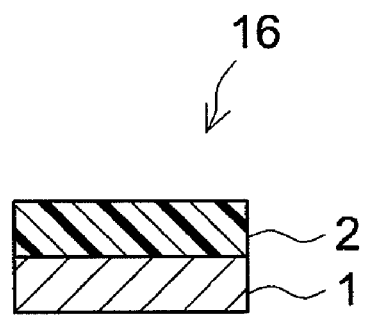

PRESSURE-SENSITIVE ADHESIVE COMPOSITION AND USE THEREOF

BACKGROUND OF THE INVENTION

1. Field of the Invention

The present invention relates to a water-dispersed pressure-sensitive adhesive (PSA) composition comprising an acrylic copolymer as a base polymer, and a PSA sheet using the same.

The present application claims priority based on Japanese Patent Application No. 2008-267298 filed on 16 Oct. 2008, and the entirety thereof is incorporated herein by reference.

2. Description of the Related Art

Water-dispersed (aqueous) acrylic pressure-sensitive compositions comprising an acrylic polymer dispersed in water make use of water as a dispersion medium, and therefore they are preferable to solvent type PSA compositions from the standpoint of protecting the environment. Thus, an acrylic, aqueous PSA composition capable of forming a PSA sheet that provides a higher level of performance is in demand for reducing the use of organic solvents. Because of its ease in handling, a double-sided PSA sheet (typically a tape) having a PSA layer on both sides of a substrate such as nonwoven fabric, etc., is widely used not only for bonding and laminating paper, synthetic resin films, etc., but also as a bonding means with good working properties and a high level of adhesive reliability in a variety of industrial fields ranging from household appliances to automobiles, various types of machinery, electric and electronic devices, nameplates and labels, etc. Therefore, it will be useful to provide an acrylic aqueous PSA composition that can be formed into a double-sided PSA sheet that provides excellent performance in these applications.

Examples of prior art documents relating to acrylic PSAs include Japanese Patent Application Laid-open Nos. 2002-167557, 2002-294209, 2001-335767, H10-279907, H8-209086, 2000-265140, 2003-193006, H8-218040, H8-333550, H11-241053, 2001-107007, and 2006-56936.

SUMMARY OF THE INVENTION

Double-sided PSA sheets need a variety of properties depending on the purpose and use thereof. As an example of one such property, when securing a material comprising an elastic foam such as a polyurethane foam, etc., (typically a foam in the form of a sheet, i.e., a foam sheet) by elastically deforming it to match the surface of an adherend (which can be curved, irregular, etc.), there is the capability of resisting the repulsive force that tries to restore the above material to its shape before deformation and maintaining that material in the aforementioned deformed shape (i.e., capability to resist the aforementioned repulsive force, also called "repulsion resistance" hereinafter). A double-sided PSA sheet used in an application wherein a foam is laminated to an adherend (e.g., in the manufacture of many products wherein the surface of the adherend has a complex shape such as in various machinery, electrical and electronic devices, etc.) can be noted as a typical example of a PSA sheet wherein such repulsion resistance is particularly important. In a case wherein a foam sheet such as a polyurethane foam, etc., is used as a substrate (support), and a double-sided PSA sheet providing a PSA layer to both sides of that substrate is deformed to match the surface shape of an adherend and applied thereto, the property of resisting the repulsive force of the substrate and holding that substrate in the deformed state (repulsion resistance) is needed to prevent the PSA sheet from peeling away from the surface of the adherend. Therefore, it will be useful to provide a double-sided PSA sheet having not only the aforementioned repulsion resistance but also exhibiting excellent adhesive properties (bonding) to adherends consisting of various materials (metal, plastic, etc.) and a high level of cohesiveness (particularly cohesiveness in a high-temperature environment (high-temperature holding strength)).

However, none of the aforementioned prior art has been able to satisfactorily resolve the problem of forming a double-sided PSA sheet using an aqueous acrylic PSA composition that manifests the above properties (adhesiveness, high-temperature cohesiveness, and repulsion resistance) at a high level.

Thus, an object of the present invention is to provide an acrylic aqueous PSA composition capable of forming a double-sided PSA sheet or other PSA sheet that manifests the above properties at a high level. A further object of the present invention is to provide a PSA sheet (typically a double-sided PSA sheet) formed using that PSA composition.

The present invention provides a water-dispersed PSA composition comprising a water-dispersed acrylic copolymer (polymer L) with a glass transition temperature (Tg) in the range of $-70°$ C. to $-50°$ C. as a base polymer thereof. The PSA composition further comprising 0.5 to 15 parts by weight of a water-dispersed acrylic copolymer (polymer H) having a Tg in the range of $30°$ C. to $120°$ C. in relation to 100 parts by weight of polymer L based on solid content. The aforementioned polymer L is obtained by the polymerization of a monomer starting material comprising 60 wt % or more of an alkyl (meth)acrylate having a $C_{8\text{-}12}$ alkyl group (monomer la) and 0.5 to 10 wt % of a radical polymerizable monomer having a carboxyl group (monomer lb). A PSA composition comprising polymer L and polymer H in the above ratio (e.g., a PSA composition wherein an aqueous emulsion of polymer L and an aqueous emulsion of polymer H are mixed at the above ratio) enables the formation of a high performance PSA (typically, a PSA layer) exhibiting a high level of the plurality of properties of adhesiveness, cohesiveness under high temperature conditions, and repulsion resistance in a good balance. Therefore, the above PSA composition is most suitable for applications forming a double-sided PSA sheet or other PSA sheet.

Herein the term "(meth)acrylate" refers to an acrylate and/or methacrylate. Similarly, the term "(meth)acryloyl" refers to an acryloyl and/or methacryloyl.

In one preferred embodiment of the PSA composition disclosed herein, the aforementioned polymer H is obtained by polymerization of a starting material comprising a radical polymerizable monomer having a carboxyl group (monomer hb) in an amount of approximately 0.5 to 10 wt % (i.e., monomer hb is copolymerized in polymer H at the above ratio). A monomer starting material of this formulation is preferred because of the excellent aqueous dispersion stability of polymer H obtained through polymerization (typically emulsion polymerization) of the monomer starting material. A PSA composition comprising polymer H with the above copolymer formulation can form a PSA sheet with an even higher level of performance.

An ethylenic unsaturated monomer having one or more (typically one or two) carboxyl groups within a single molecule can be preferably used as monomer hb. In one preferred embodiment, monomer hb contains acrylic acid (AA) and methacrylic acid (MAA). A PSA composition comprising polymer H with such a copolymer formulation can form a PSA sheet with an even higher level of performance. Monomer hb preferably contains AA and MAA at a weight ratio, for example, such that AA/MAA is approximately 0.1 to 10.

Preferably the aforementioned polymer H is obtained by polymerization of a monomer starting material comprising 50 wt % or more of one or more type of monomer (monomer ha) selected from a group consisting of alkyl (meth)acrylate and cycloalkyl (meth)acrylate having a homopolymer Tg of approximately 60 to 120° C. A PSA composition comprising polymer H with such a copolymer formulation can form a PSA sheet with an even higher level of performance (e.g., a double-sided PSA sheet).

The weight-average molecular weight (Mw) of polymer H can be, for example, approximately $0.5 \times 10^4$ to $200 \times 10^4$. In one preferred embodiment polymer H is configured as an aqueous emulsion with an average particle size of approximately 0.05 μm to 0.8 μm. An aqueous emulsion having such an average particle size is preferred from one or more aspects such as ease of manufacture (typically manufactured by emulsion polymerization of the aforementioned monomer materials), ease of handling, dispersion stability, etc. More preferably, the average particle size of the aqueous emulsion of polymer H is approximately 0.05 μm to 0.3 μm. Such a PSA composition can form a PSA sheet with an even higher level of performance.

An acrylic monomer having one or more (typically one) carboxyl groups within a single molecule can be preferably used as monomer lb. In one preferred embodiment the aforementioned monomer lb contains AA and MAA. Monomer lb preferably contains AA and MAA at a weight ratio, for example, such that AA/MAA is approximately 0.1 to 10. A PSA composition comprising polymer L having such a copolymer formulation can form a PSA sheet with an even higher level of performance.

In one preferred embodiment of the PSA composition disclosed herein, in addition to polymer L and polymer H, the composition further comprising a tackifying resin (which can take the form of an aqueous emulsion) at approximately 10 to 40 parts by weight (based on solid content) in relation to 100 parts by weight of polymer L. Such a PSA composition can form a PSA sheet with an even higher level of performance.

In one preferred embodiment the gel fraction (weight ratio of ethyl acetate insoluble component in the non-volatile component of the composition) of the aforementioned composition is approximately 30 to 60%. A PSA sheet featuring a PSA layer formed from a composition with such a gel fraction can have an even higher level of performance. In the mode of a PSA sheet (typically a double-sided PSA sheet) formed by a PSA layer on a porous substrate such as nonwoven fabric, etc., establishing a gel fraction of the PSA composition in the above range is particularly effective from the standpoint of sufficient impregnation of the substrate, etc.

The present invention also provides a PSA sheet featuring a PSA layer formed from any of the PSA compositions disclosed herein (e.g., it can be configured as a double-sided PSA sheet featuring the aforementioned PSA layer on both sides of a substrate sheet). Because such a PSA sheet can exhibit the aforementioned kind of high performance, it can be preferably used in a variety of applications (e.g., applications for mounting a part in the manufacture of various types of machinery, electrical and electronic devices, automobiles, etc.) More specifically, it can be applied most preferably when using a PSA sheet (typically a double-sided PSA sheet) to secure an elastic foam substrate such as a polyurethane foam, etc., (typically a foam in the form of a sheet, i.e., a foam sheet) or a rigid substrate such as a polyethylene terephthalate (PET) substrate, etc., by deforming it to match the surface of an adherend (which can be curved, irregular, etc.) In addition, because the PSA sheet uses an aqueous (water-dispersed) acrylic PSA composition, it is preferred from the standpoint of environmental health.

Due to increased awareness about protecting the global environment, there has been a trend in recent years to promote breaking down various manufactured products and reprocessing or reusing (recycling) their components rather than discarding the whole product after use as in the past to save resources, save energy, reduce the amount of refuse, etc. Accompanying this trend, new properties are now sought for PSA sheets used in various manufactured products. More specifically, PSA sheets used for securing parts that are expected to be recycled (hereinafter, also called "parts for recycling") (e.g., doubled-sided PSA sheets used to secure parts for recycling) are required to have the capability of strongly bonding to the part for a long period of time while the product is being used, but when the part is being recycled, also to have the capability of enabling the PSA sheet to be peeled off without adhesive residue remaining on the surface of the part (adhesive residue prevention) and capability for the PSA sheet not to tear during peeling (tearing prevention) in order to perform the removal operation efficiently.

A PSA sheet featuring a PSA layer formed from any of the PSA compositions disclosed herein on either one side or both sides of a substrate sheet can be a PSA sheet that has excellent adhesive residue prevention and tearing prevention (and therefore, excellent recyclability). From the standpoint of the aforementioned tearing prevention, it is preferable for the measured tensile strength of the aforementioned PSA sheet to be approximately 10 N/10 mm or more both in a first direction of the PSA sheet (e.g., lengthwise direction in a long and narrow PSA sheet) and also in a second direction that is perpendicular thereto. For example, in a double-sided PSA sheet featuring the aforementioned PSA layer on both sides of a nonwoven fabric (substrate), the measured tensile strength in both the machine direction and in the transverse direction of the nonwoven fabric is preferably approximately 10 N/10 mm or more.

In one preferred embodiment the total amount of volatile organic compounds (TVOC) emitted from the aforementioned PSA sheet when it is heated for 30 min at 80° C. is 1000 μg or less per 1 g of PSA sheet. A PSA sheet satisfying this property is preferred from the standpoint of protecting the environment. Such a PSA sheet is particularly useful in fields where there is a strong demand for a reduction in VOC, e.g., indoor household appliances, construction materials, the automobile industry, etc.

BRIEF DESCRIPTION OF THE DRAWINGS

FIG. 1 is a cross-sectional drawing schematically illustrating one example of a configuration of the PSA sheet of the present invention;

FIG. 2 is a cross-sectional drawing schematically illustrating a different example of a configuration of the PSA sheet of the present invention;

FIG. 3 is a cross-sectional drawing schematically illustrating a different example of a configuration of the PSA sheet of the present invention;

FIG. 4 is a cross-sectional drawing schematically illustrating a different example of a configuration of the PSA sheet of the present invention;

FIG. 5 is a cross-sectional drawing schematically illustrating a different example of a configuration of the PSA sheet of the present invention; and FIG. 6 is a cross-sectional drawing schematically illustrating a different example of a configuration of the PSA sheet of the present invention.

DETAILED DESCRIPTION OF THE INVENTION

Preferred embodiments of the present invention are described below. Matters other than the those specifically disclosed herein that are necessary for the working of the present invention can be considered matters of design for a person skilled in the art based on prior art in this field. In other words, the present invention can be worked based on the content disclosed herein and on common technical knowledge in the field.

Polymer L in the technology disclosed herein is an aqueous pressure-sensitive acrylic copolymer having a Tg in the range of approximately −70° C. to −50° C. A PSA composition having a polymer L with a Tg in the above range as a base polymer (main component among the polymer components) can provide a PSA composition that can deliver a high performance PSA sheet (e.g., a double-sided PSA sheet realizing a good balance of adhesiveness, high-temperature cohesiveness, and repulsion resistance at a high level).

If the Tg of polymer L is too much lower than −70° C., the cohesiveness of the PSA is likely to be inadequate. As a result, when a PSA sheet that has been continuously bonded to an adherend for a long period of time is peeled off, adhesive residue is likely to remain on the surface of the adherend. On the other hand, if the Tg of polymer L is too much higher than −50° C., a PSA sheet using a PSA composition having such a polymer L as the base polymer thereof is likely to have inadequate adhesion to an adherend with an irregular surface such as a foam, etc. Furthermore, when the aforementioned PSA sheet is one having a porous substrate (support) such as a nonwoven fabric, etc., (typically a double-sided PSA sheet), the impregnation of the porous material will be inadequate, and when the PSA sheet that has been continuously bonded to an adherend for a long period of time is peeled off, adhesive residue is likely to remain, the PSA sheet is likely to tear easily, etc. Preferably the Tg of polymer L is in the range of −65° C. to −55° C. (e.g., −63° C. to −58° C.).

Herein the term Tg (glass transition temperature) refers to a value obtained from the Fox equation based on the Tg of a homopolymer of each monomer constituting the monomer starting material and the monomer weight fraction (copolymer blend ratio). The values listed in the publicly known references *Nenchaku Gijutsu Handbook* [Adhesion Technology Handbook], published by Nikkan Kogyo Shimbun [Business and Technology Daily News] or *Polymer Handbook* published by Wiley-Interscience are used herein for the Tg values of the homopolymers. For example, −70° C. for 2-ethylhexyl acrylate; −54° C. for butyl acrylate; 8° C. for methyl acrylate; 105° C. for methyl methacrylate; 66° C. for cyclohexyl methacrylate; 32° C. for vinyl acetate; 106° C. for acrylic acid; and 228° C. for methacrylic acid are used as Tg values of the homopolymers in the art disclosed herein. Additionally, values calculated by the following method were used for the homopolymer Tg values of monomers not listed in these publicly known references. First, solution polymerization of a target monomer was carried out to synthesize a homopolymer with a weight-average molecular weight of $5 \times 10^4$ to $10 \times 10^4$, and then the obtained homopolymer solution was flow-cast onto a release liner and dried to prepare a test sample. Next, differential scanning calorimetry (DSC) was carried out on the test sample by varying the temperature from −80° C. to 280° C. at a heating rate of 10° C./min using a differential scanning calorimeter (SII NanoTechnology Inc., model DSC6220) and the temperature at the initial stage of heat absorption was used as the Tg for that homopolymer.

Polymer L is obtained by the polymerization (typically emulsion polymerization) of a monomer starting material comprising at least monomer 1a and monomer 1b.

Monomer 1a is an alkyl (meth)acrylate having a $C_{8-12}$ alkyl group, and it is a component accounting for 60 wt % or more (typically 60 to 98 wt %, eg., 60 to 90 wt %) of the total monomer starting material constituting polymer L. A monomer starting material comprising monomer 1a at such a ratio is preferred because it is easy to adjust the composition of the monomer starting material so that the Tg of polymer L will lie within the aforementioned range. Using this kind of alkyl (meth)acrylate with a relatively large number of carbon atoms in the alkyl group as the main monomer is advantageous for increasing adhesiveness to an adherend with low polarity such as a polyolefin, etc.

Specific examples of the alkyl (meth)acrylate that can be used as monomer 1a include the following: 2-ethylhexyl (meth)acrylate; octyl (meth)acrylate; isooctyl (meth)acrylate; nonyl (meth)acrylate; isononyl (meth)acrylate; decyl (meth)acrylate; isodecyl (meth)acrylate; undecyl (meth)acrylate; dodecyl (methacrylate); and the like. Provided the Tg of polymer L can be adjusted to the above range, these alkyl (meth)acrylate can be used as one type alone or two or more types thereof in combination. Preferred examples of monomer 1a in the present invention are 2-ethylhexyl acrylate, isooctyl acrylate, and isononyl acrylate. The use of 2-ethylhexyl acrylate and/or iso-octyl acrylate is especially preferred. It is also preferable for one or more types (typically one) selected from a group consisting of alkyl acrylates having a $C_{8-10}$ alkyl group to comprise 70 to 100 wt % of monomer 1a. For example, a monomer starting material of a composition wherein essentially all of monomer 1a is 2-ethylhexyl acrylate (2EHA) can be preferably used.

Monomer 1b is a radical polymerizable monomer having one or more (typically one or two) carboxyl groups within a single molecule, and is a component accounting for 0.5 to 10 wt % (preferably 0.5 to 7 wt %, more preferably 0.5 to 5 wt %, e.g., 1 to 5 wt %) of the total monomer starting material constituting polymer L. If the amount of monomer 1b is too much smaller than the above range, the cohesive strength of the PSA is likely to be inadequate. This is thought to occur because it becomes difficult for monomer 1b to function sufficiently as a crosslinking point in polymer L. Such an inadequacy in cohesive strength can be the cause of adhesive residue remaining on the surface of an adherend when a PSA sheet that has been continuously bonded to that adherend for a long period of time is peeled off. Furthermore, if the amount of monomer 1b is too small, the stability of an aqueous dispersion of polymer L (and even the stability of an aqueous dispersion of a PSA composition comprising polymer L) is likely to be too low. On the other hand, if the amount of monomer 1b is too much greater than the above range, it is very difficult to prepare a composition of monomer starting material such that the Tg of polymer L will lie in the aforementioned range. As a result, insufficient bonding to the kind of irregular surface noted above, adhesive residue left behind because of insufficient impregnation into a porous substrate (nonwoven fabric, etc.), and tearing of the PSA sheet are more likely to occur.

An ethylenic unsaturated monomer (monomer with one or more ethylenic unsaturated groups such as a (meth)acrylic group, vinyl group, etc., within a single molecule) having at least one (typically one or two) carboxyl groups within a single molecule can be preferably used as monomer 1b. Specific examples include the following: acrylic acid; methacrylic acid; itaconic acid; itaconic anhydride; crotonic acid; maleic acid; maleic anhydride; 2-(meth)acryloyloxyethyl phthalic acid; 2-(meth)acryloyloxyethyl hexahydrophthalic acid; and the like. One of the above types can be used alone, or two or more types thereof can be used in combination. It can be noted that acrylic acid (AA) and methacrylic acid (MAA) are especially preferred as monomer lb in the present invention.

In one preferred embodiment of the present invention AA and MAA are used in combination as monomer lb. A PSA composition comprising a polymer L of such a monomer components (i.e., a polymer components) can deliver a PSA sheet with an even higher level of performance (e.g., even better repulsion resistance). The weight ratio of AA to MAA (AA/MAA) can lie in a range of approximately 0.1 to 10, for example, and a range of approximately 0.3 to 4 (e.g., approximately 0.5 to 3) is even more preferred. If AA/MAA is too much lower than the above range, it becomes difficult to realize an adequate increase in repulsion resistance. However, if AA/MAA is too much higher than the above range, the PSA properties are likely to decrease over time after the PSA sheet is fabricated.

In addition to monomers la and lb, the monomer starting material constituting polymer L can also contain a different radical polymerizable monomer (monomer lc) capable of copolymerization therewith. Examples of a monomer that can be used as monomer lc include the following: an alkyl (meth)acrylate having a $C_{1-7}$ alkyl group such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, neopentyl (meth)acrylate, hexyl (meth)acrylate, heptyl (meth)acrylate, etc.; or an alkyl (meth)acrylate having an alkyl group of 13 or more carbon atoms (preferably $C_{13-18}$) such as tridecyl (meth)acrylate, stearyl (meth)acrylate, etc.

Other examples of a monomer that can be used as monomer lc include the following ethylenic unsaturated monomers having various functional groups (hereinafter, referred to as a "functional group-containing monomers"):

an ethylenic unsaturated monomer having an amino group, e.g., an N-alkyl amino alkyl (meth)acrylate such as N-methyl aminoethyl (meth)acrylate, N-ethyl aminoethyl (meth)acrylate, and N-t-butyl aminoethyl (meth)acrylate; or an N,N-dialkyl amino alkyl (meth)acrylate, e.g., N,N-dimethyl aminoethyl (meth)acrylate, N,N-diethyl aminoethyl (meth)acrylate, etc.;

an ethylenic unsaturated monomer having a hydroxyl group, e.g., a hydroxyalkyl (meth)acrylate such as 2-hydroxyethyl (meth)acrylate, 2-hydroxypropyl (meth)acrylate, 3-hydroxypropyl (meth)acrylate, and 2-hydroxybutyl (meth)acrylate; or a vinyl alcohol, allyl alcohol, or N-methylol acrylamide, etc.;

an ethylenic unsaturated monomer having a keto group such as diacetone (meth)acrylamide, diacetone (meth)acrylate, vinyl methyl ketone, vinyl ethyl ketone, allyl acetoacetate, and vinyl acetoacetate, etc.;

an ethylenic unsaturated monomer having an amid group such as (meth)acrylamide, N,N-dimethyl (meth)acrylamide, N-methoxymethyl (meth)acrylamide, and N-butoxymethyl (meth)acrylamide, etc.; and an ethylenic unsaturated monomer having an epoxy group such as glycidyl (meth)acrylate, methylglycidyl (meth)acrylate, and allyl glycidyl ether, etc.

Other examples of a monomer that can be used as monomer lc include the following: a polyfunctional (meth)acrylate, i.e., an ethylenic unsaturated monomer having two or more (meth)acryloyl groups in one molecule such as ethylene glycol di(meth)acrylate, glycerol di(meth)acrylate, dipropylene glycol di(meth)acrylate, hexanediol di(meth)acrylate, neopentyl glycol di(meth)acrylate, trimethylolpropane tri(meth)acrylate, tetramethylolmethane tri(meth)acrylate, dipentaerythritol hexa(meth)acrylate, etc. Additional examples include an ethylenic unsaturated monomer such as a vinyl ester, e.g., vinyl acetate, vinyl propionate, etc.; an aromatic vinyl compound, e.g., styrene, α-methyl styrene, vinyl toluene, etc.; a (meth)acrylic acid ester of a cyclic alcohol, e.g., cyclopentyl (meth)acrylate, cyclohexyl (meth)acrylate, isobornyl (meth)acrylate, etc.; and also (meth)acrylonitrile, N-(meth)acryloyl morpholine, N-vinyl-2-pyrrolidone, and the like.

Even other examples of monomers that can be used as monomer lc include an ethylenic unsaturated monomer having at least one (preferably two or more, e.g., two or three) alkoxysilyl groups in one molecule, such as 3-(meth)acryloxy propyl trimethoxy silane, 3-(meth)acryloxy propyl triethoxy silane, 3-(meth)acryloxy propyl methyl dimethoxy silane, and 3-(meth)acryloxy propyl methyl diethoxy silane. One type of such a monomer containing an alkoxysilyl group can be used alone, or two or more types thereof can be used in combination. A crosslinking structure due to the condensation reaction of a silanol group (silanol condensation) can be introduced into a PSA formed from the PSA composition comprising polymer L through copolymerization with a monomer containing such an alkoxysilyl group. The use of about 0.005 to 0.1 wt % (e.g., 0.01 to 0.03 wt %) of the monomer starting material is suitable.

One type of such a monomer can be used alone, or two or more types thereof can be used in combination as monomer lc. An alkyl (meth)acrylate having either 1 to 7 carbon atoms or having 13 or more carbon atoms can be noted as a monomer lc that can be preferably used. Examples thereof are methyl acrylate (MA), ethyl acrylate (EA), butyl acrylate (BA) and isostearyl acrylate. Among the above, it can be noted that MA, EA, and BA are preferred. The content of the alkyl (meth)acrylate having either 1 to 7 carbon atoms or having 13 or more carbon atoms can be, for example, 1 to 39.5 wt % (preferably 5 to 35 wt %, e.g., 10 to 30 wt %) of the monomer starting material.

Typically polymer L can be obtained by emulsion polymerization of the kind of aforementioned polymer starting material. The mode of emulsion polymerization is not particularly limited herein, and for example, publicly known monomer supply methods, polymerization conditions (polymerization temperature, polymerization time, polymerization pressure, etc.), and materials (polymerization initiator, surfactant, etc.) can be used as needed, and the process can be carried out in the same manner as conventional publicly known general emulsion polymerization. For example, as a method for supplying the monomers to the reaction vessel (polymerization vessel), a batch supply process wherein all the monomer starting material is supplied at once, a continuous feed (drip) process, or a semi-batch feed (drip) process, etc., can all be used. It is also possible to mix all or part of the monomer starting material (typically all) with water (typically an appropriate amount of emulsifier is used together with water) beforehand, emulsify the same, and feed that liquid emulsion (monomer emulsion) into the reaction vessel by a batch, semi-batch, or continuous process. The process that involves dripping the monomer emulsion into the reaction vessel can be preferably used for one or more of the following reasons: it is easy to control the reaction temperature and particle size; a high degree of polymerization is easy to obtain; and it is applicable to the manufacture of an emulsion containing polymer L at a high concentration (e.g., 50 wt % or more, typically 50 to 70 wt %).

The following can be used as an emulsifier (surfactant): an anionic emulsifier, e.g., sodium lauryl sulfate, ammonium lauryl sulfate, sodium dodecylbenzene sulfonate, sodium polyoxyethylene alkyl ether sulfate, ammonium polyoxyethylene alkylphenyl ether sulfate, sodium polyoxyethylene alkylphenyl ether sulfate, etc.; and a nonionic emulsifier, e.g., polyoxyethylene alkyl ether, polyoxyethylene alkylphenyl ether, and the like. A radical polymerizable emulsifier (reactive emulsifier) with a structure wherein a radical polymerizable group (propenyl group, etc.) is inserted into the kind of aforementioned anionic or nonionic emulsifier can be used. Such an emulsifier can be used as one type alone, or two or more types thereof can be used in combination. The amount of emulsifier to be used (based on solid content) can be, for example, approximately 0.2 to 10 parts by weight (preferably, approximately 0.5 to 5 parts by weight) in relation to 100 parts by weight of monomer starting material.

Either a water-soluble or oil-soluble polymerization initiator can be used. Examples include azo initiators, e.g., 2,2'-azobis isobutyronitrile, 2,2'-azobis(2-methylpropionamidine)disulfate, 2,2-azobis(2-amidinopropane) dihydrochloride, 2,2'-azobis[2-(5-methyl-2-imidazolin-2-yl) propane]dihydrochloride, 2,2'-azobis(N,N'-dimethylene isobutyl amidine)dihydrochloride, and 2,2'-azobis[N-(2-carboxyethyl)-2-methyl propionamidine]hydrate, etc.; persulfates such as potassium persulfate, ammonium persulfate, etc.; peroxide initiators such as benzoyl peroxide, t-butyl hydroperoxide, hydrogen peroxide, etc.; redox initiators wherein a peroxide and a reducing agent are combined such as a combination of a persulfate and sodium hydrogen sulfite, a combination of a peroxide and sodium ascorbate, etc.; and the like, but these examples are not limited thereto. The amount of polymerization initiator to be used can be suitably selected in accordance with the type of initiator, types of monomers (formula of the monomer starting material) and the like, but normally selecting from a range of approximately 0.01 to 1 parts by weight, for example, in relation to 100 parts by weight of the monomer starting material will be appropriate. A batch process wherein essentially all of the polymerization initiator to be used is placed in the reaction vessel (typically, an aqueous solution of the polymerization initiator is prepared in the reaction vessel) before starting the feed of monomer starting material, a continuous process, or a semi-batch process can all be used as the method of supplying the polymerization initiator. From the standpoint of ease of the polymerization operation and easy of process step control, the batch process, for example, can be preferably used. The polymerization temperature can be set, for example, at approximately 20 to 100° C. (typically 40 to 80° C.).

When polymerizing the aforementioned monomer starting material to synthesize polymer L, if unreacted (unpolymerized) monomer remains, it can cause an increase in the TVOC (total volatile organic compounds) of the PSA sheet. Therefore, the higher the degree of polymerization of the monomer starting material that can be obtained, the better and, preferably it will be at least 98% or more (typically 98 to 100%, and even more preferably 99 to 100%). Various measures known to be effective for increasing the degree of polymerization (reducing the residual amount of unreacted monomer) can be used either alone or in a suitable combination thereof to realize such a degree of polymerization. Examples of measures that are effective for increasing the degree of polymerization include the following: removing oxygen ($O_2$) from the inside of the reaction vessel before starting polymerization (e.g., carrying out a complete substitution thereof with an inert gas such as $N_2$); extending the polymerization reaction time; and adding a supplemental polymerization initiator (e.g., a redox initiator) to the reaction vessel after the monomer starting material has been fed into the reaction vessel, and the like.

The degree of polymerization referred to herein can be determined, for example, according to the following sequence based on the weight of the nonvolatile component (actual nonvolatile component) remaining after drying the liquid reaction product (e.g., emulsion of polymer L) obtained in the above polymerization, and the weight of the nonvolatile component (theoretical nonvolatile component) when the used monomer starting material is 100% polymerized.

[Method for Calculating Degree of Polymerization]

First approximately 1 g (weight $W_{a1}$) of polymerization reaction product is weighed out into an aluminum dish (weight $W_{a2}$), and the weight in each dish (weight $W_{a3}$) is measured after drying at 130° C. for 2 hours. Then the actual non-volatile component is determined by inserting those values into the formula:

$$\text{Actual non-volatile component}[\%]=[(W_{a3}-W_{a2})/W_{a1}]\times 100.$$

The theoretical non-volatile component is determined from the total weight of the monomer starting material and other materials loaded into the reaction vessel in obtaining the aforementioned polymerization reaction liquid (weight including non-volatile components such as water, etc., weight $W_{a4}$) and the total weight of the non-volatile components of the aforementioned other materials and the monomer starting material (weight $W_{a5}$) by using the following formula:

$$\text{Theoretical non-volatile component}[\%]=[W_{a5}/W_{a4}]\times 100.$$

Then the degree of polymerization is determined by the following formula:

$$\text{Degree of polymerization}[\%]=[(\text{actual non-volatile component})/(\text{theoretical non-volatile component})]\times 100.$$

A chain transfer agent of a conventional, publicly known type (that can also be interpreted as a molecular weight regulator or degree of polymerization regulator) can be used in the aforementioned polymerization process (typically emulsion polymerization). This chain transfer agent can be one or more types selected from the following: mercaptans such as dodecyl mercaptan (dodecanethiol), glycidyl mercaptan, 2-mercapto ethanol, mercaptoacetic acid, 2-ethylhexyl thioglycolate, and 2,3-dimercapto-1-propanol, etc.; an α-methyl styrene dimer; and a terpene such as α-pinene, limonene, terpinol, etc. One type can be used alone or two or more types thereof can be used in combination. The amount of chain transfer agent to be used can be, for example, 0.001 to 1 parts by weight in relation to 100 parts by weight of monomer starting material, and normally about 0.01 to 0.8 parts by weight is preferred.

The weight-average molecular weight (Mw) of polymer L is preferably about $25\times 10^4$ to $130\times 10^4$, and more preferably about $30\times 10^4$ to $100\times 10^4$ (e.g., $40\times 10^4$ to $95\times 10^4$). If the Mw of polymer L is too much lower than the aforementioned range, the cohesiveness of the PSA is likely to be inadequate. As a result, when a PSA sheet that has been continuously bonded to an adherend for a long period of time is peeled off, adhesive residue is likely to remain on the surface of the adherend. If the Mw of polymer L is too much greater than the aforementioned range, the adhesiveness to an adherend with an irregular surface (a foam, etc.), is likely to be inadequate.

Furthermore, when the aforementioned PSA sheet has a porous substrate (support) such as a nonwoven fabric, etc., (typically a double-sided PSA sheet), the impregnation of the porous material will be inadequate, and as a result when a PSA sheet that has been continuously bonded to an adherend for a long period of time is peeled off, adhesive residue is likely to remain, the PSA sheet is likely to tear easily, etc.

In the present invention the term weight-average molecular weight refers to the polystyrene-converted weight-average molecular weight obtained when a measurement sample (e.g., the non-volatile component obtained by drying an aqueous emulsion of polymer L) is extracted with tetrahydrofuran (THF), and the resulting soluble component (also called the sol component) is measured by gel permeation chromatography (GPC).

Polymer L in the PSA composition disclosed herein can be used in the form of an aqueous emulsion, for example, with an average particle size of 0.05 µm to 0.8 µm (preferably 0.1 µm to 0.7 µm). If the average particle size of polymer L is too much smaller than the aforementioned range, it becomes difficult to produce (polymerize) an emulsion containing polymer L stably at a high concentration. If the average particle size of polymer L is too much larger than the aforementioned range, adhesion between the particles is likely to be inadequate when a PSA layer is formed from a PSA composition containing polymer L, and as a result, adhesive residue is likely to remain on the surface of the adherend when the PSA sheet is peeled off.

The average particle size in the present invention is the average particle size obtained using a laser diffraction particle size analyzer (e.g., Beckman-Coulter model LS13 320).

In one preferred embodiment of the PSA composition disclosed herein, polymer L constitutes an aqueous emulsion with an average particle size of 0.1 µm to 0.4 µm. A PSA sheet with an even higher level of performance can be formed by a PSA composition comprising a polymer L with such a relatively small particle size. The polymerization conditions (e.g., type of emulsifier, amount used, method of use, etc.) of the monomer starting material can be set so that an aqueous emulsion of polymer L satisfying such an average particle size will be formed.

Polymer H of the technology disclosed herein is a component that can increase adhesiveness while inhibiting a decrease in other performance characteristics by being admixed with polymer L at the specified ratio. In the past the addition of a tackifying resin typified by rosin resins and terpene resins has been widely used as means for increasing adhesive strength. However, when the added amount of tackifying resin is increased with the goal of obtaining a PSA sheet with an even higher level of performance, this tends to adversely affect the other PSA performance characteristics. For example, in a PSA composition containing a large amount (e.g., approximately 50 parts by weight or more based on solid content in relation to 100 parts by weight of the base polymer) of a tackifying resin with a high softening point, the repulsion resistance of a PSA sheet formed using that composition will decrease because the elasticity of the PSA will become too high, impregnation of a porous support (nonwoven fabric, etc.) will be inadequate, and when a PSA sheet that has been continuously bonded to an adherend for a long period of time is peeled off, adhesive residue is likely to remain, and the PSA sheet is likely to tear easily (i.e., a decrease in recyclability), and the bonding (anchoring) to an irregular surface such as a foam, etc., is likely to decrease. In addition, adhesiveness (particularly initial adhesive strength) and adhesion (stickiness) are likely to be inadequate in a low temperature environment. On the other hand, in a PSA composition containing a large amount of a tackifying resin with a low softening point, the repulsion resistance of the PSA sheet will decrease because the elasticity of the PSA will become too low, and when the PSA sheet is peeled off after continuous bonding to an adherend for a long period of time, adhesive residue is likely to remain because of inadequate cohesiveness.

By using polymer H according to the present invention, it is possible to increase adhesive strength while inhibiting a decrease in other PSA performance characteristics (e.g., cohesiveness, repulsion resistance, recyclability, etc.). As a result, a PSA composition can be provided that delivers a PSA sheet (e.g., a double-sided PSA sheet) that can be preferably used for mounting parts for recycling while realizing a variety of properties at a high level.

Polymer H is an aqueous acrylic copolymer with a Tg in the range of approximately 30° C. to 120° C. (preferably 40° C. to 110° C., and more preferably 50° C. to 110° C., e.g., 70° C. to 110° C.). If the Tg of polymer H is too much lower than the aforementioned range, the advantageous effect (typically, an effect of increasing adhesive strength) of admixing polymer H into the composition is likely to decrease. If the Tg of polymer H is too much higher than the aforementioned range, the repulsion resistance of the PSA sheet will decrease, impregnation of a porous support of nonwoven fabric, etc., will be inadequate, adhesive residue is likely to remain, the PSA sheet is likely to tear easily, and the bonding (anchoring) to an irregular surface is likely to decrease. In addition, adhesion and tack (stickiness) are likely to be inadequate in a low temperature environment.

An aqueous acrylic copolymer obtained by the polymerization (typically emulsion polymerization) of a monomer starting material containing 0.5 to 10 wt % of a radical polymerizable monomer having one or more (typically one or two) carboxyl groups in the same molecule (monomer hb) can be preferably used as polymer H in the technology disclosed herein. Preferably the content of monomer hb in the aforementioned monomer starting material is 1 to 8 parts by weight, and more preferably 2 to 6 parts by weight. If the amount of monomer hb is too much smaller than the aforementioned range, the cohesiveness of the PSA is likely to be inadequate. Such a lack of cohesiveness can be the cause of adhesive residue remaining on the surface of an adherend when a PSA sheet that has been constantly bonded to an adherend for a long period of time is peeled off. If the amount of monomer hb is too small, the stability of an aqueous dispersion of polymer H (and even the stability of an aqueous dispersion of a PSA composition comprising polymer H) is likely to be too low. On the other hand, if the amount of monomer hb is too much greater than the aforementioned range, inadequate adhesiveness to an irregular surface, adhesive residue due to inadequate impregnation of the porous material (nonwoven fabric, etc.), tearing of the PSA sheet during the peeling off process, etc., can be more likely to occur.

A radical polymerizable monomer containing a carboxyl group similar to that of monomer lb can preferably be used as monomer hb. One of these types can be used alone, or two or more types thereof can be used in combination. AA and MAA are especially preferred as monomer hb in the present invention. The combined use of AA and MAA is also preferred. A PSA composition comprising a polymer H of such monomer components (i.e., polymer components) can deliver a PSA sheet with an even higher level of performance (e.g., even better repulsion resistance). The weight ratio of AA to MAA (AA/MAA) can lie in a range of approximately 0.1 to 10, for example, and a range of approximately 0.3 to 4 (e.g., approximately 0.5 to 3) is even more preferred.

A component other than monomer hb constituting the monomer starting material constituting polymer H can be a different radical polymerizable monomer capable of copolymerization with monomer hb. A monomer that is the same as monomer la or lc described above can be used as the aforementioned radical polymerizable monomer. Methyl (meth) acrylate, ethyl methacrylate, cyclohexyl methacrylate, n-butyl methacrylate, t-butyl methacrylate, isostearyl acrylate, isobornyl (meth)acrylate, lauryl (meth)acrylate, styrene, and acrylonitrile can be listed as preferably used monomers. One type alone or a combination of two or more types selected from such monomers can be used in a ratio such that the Tg of polymer H lies in the aforementioned range.

In one preferred embodiment, 50 wt % or more (typically 50 to 99.5 wt %, preferably 70 to 99 wt %, e.g., 90 to 99 wt %) of the monomer starting material constituting polymer H is one or more types of monomers selected from an alkyl (meth) acrylate and cycloalkyl (meth)acrylate having a homopolymer Tg of 60° C. to 120° C. (monomer ha). Methyl methacrylate, cyclohexyl methacrylate, ethyl methacrylate, t-butyl methacrylate, etc., can be noted as specific examples of monomer ha. One of these types can be used alone, or two or more types thereof can be used in combination.

Polymer H is typically obtained by carrying out emulsion polymerization of the aforementioned kind of monomer starting material. The mode of emulsion polymerization is not particularly limited herein. For example, in the same manner as in the emulsion polymerization of polymer L described above, the process can be carried out similarly as conventional publicly known general emulsion polymerization. The type of emulsifier and polymerization initiator used in the polymerization, as well as the amounts, polymerization conditions, etc., can be the same as in the emulsion polymerization of polymer L.

For the same reasons as with polymer L described above, when synthesizing polymer H by polymerization (typically emulsion polymerization) of the aforementioned monomer starting material, the higher the degree of polymerization that can be obtained, the better and, preferably it will be at least 98% or more (typically 98 to 100%, and even more preferably 99 to 100%). The same measures used in the polymerization of polymer L can be suitably used as measures for realizing such a degree of polymerization.

Polymer H in the PSA composition disclosed herein can be used in the form of an aqueous emulsion, for example, with an average particle size of 0.05 μm to 0.8 μm (preferably 0.1 μM to 0.7 μm). If the average particle size of polymer H is too much smaller than the aforementioned range, it becomes difficult to produce (polymerize) an emulsion containing polymer H stably at a high concentration. If the average particle size of polymer H is too much larger than the aforementioned range, the advantageous effect (e.g., an effect of increasing adhesive strength) of admixing polymer H into the composition is not likely to be adequately realized. Moreover, in the same manner as in the case of the average particle size of polymer L, the average particle size of polymer H can be adjusted, for example, by suitably setting the amount of emulsifier to be used in the emulsion polymerization thereof.

In one preferred embodiment of the PSA composition disclosed herein polymer H is configured as an aqueous emulsion with an average particle size of 0.1 μm to 0.4 μm. A PSA sheet with an even higher level of performance can be formed in accordance with a PSA composition comprising polymer H with a relatively small particle size.

The weight-average molecular weight (Mw) of polymer H preferably lies in a range of about $0.5 \times 10^4$ to $200 \times 10^4$, and more preferably about $1 \times 10^4$ to $150 \times 10^4$ (typically $1 \times 10^4$ to $100 \times 10^4$). In a PSA composition containing a polymer H with an Mw that is too much lower than the aforementioned range, the properties (e.g., cohesiveness) of a PSA sheet formed therefrom are likely to decrease, and a balance in performance is likely to be lost. On the other hand, if the Mw of polymer H is too much greater than the aforementioned range, the repulsion resistance of the PSA sheet will decrease because the elasticity of the PSA will become too high, impregnation of a porous support such as a nonwoven fabric will be inadequate, adhesive residue is likely to remain, the PSA sheet is likely to tear easily, and the bonding (anchoring) to an irregular surface is likely to decrease. In addition, adhesion and tack are likely to be inadequate in a low temperature environment. A polymer H with an Mw of about $1 \times 10^4$ to $10 \times 10^4$, for example, can be preferably used. A polymer H satisfying such an Mw can be produced (synthesized) by using 0.5 to 5 parts by weight of chain transfer agent in relation to 100 parts by weight of monomer starting material.

The aqueous PSA composition disclosed herein comprises 0.5 to 15 parts by weight of polymer H in relation to 100 parts by weight of polymer L based on solid content. Preferably such a PSA composition can be produced by preparing, for example, an aqueous emulsion of polymer L and an aqueous emulsion of polymer H (typically, aqueous emulsions for carrying out emulsion polymerization of each monomer starting material that contains monomer components matching the copolymer composition of each polymer), and mixing these aqueous emulsions together. If the content of polymer H in relation to polymer L is too much lower than the aforementioned range, a sufficiently advantageous effect (typically an effect of increasing adhesive strength) of admixing polymer H into the composition will be difficult to obtain. If the content of polymer H in relation to polymer L is too much greater than the aforementioned range, cohesiveness and repulsion resistance are likely to decrease, and properties (adhesion, tack, etc.) are likely to be inadequate in a low temperature environment. In one preferred embodiment of the PSA composition disclosed herein, the PSA composition contains 2 to 10 parts by weight of polymer H in relation to 100 parts by weight of polymer L. A PSA sheet with an even higher level of performance can be formed by using such a composition.

From the standpoint of productivity of a PSA sheet, preferably the non-volatile component (NV) of the aforementioned PSA composition is 40% or higher, and more preferably 45% or higher. The upper limit of the NV is not particularly limited herein, but from the standpoint of ease of manufacturing and storage stability, normally it is preferable to set the NV at 70% or lower (e.g., 60% or lower). Because a PSA composition satisfying such an NV is easy to obtain, preferably the NV of the aqueous emulsion of polymer L is 45% or higher (even more preferably 50% or higher, typically 70% or lower). In addition, preferably the NV of the aqueous emulsion of polymer H is 35% or higher (typically 70% or lower, e.g., 40 to 60%).

The measurement of NV can be carried out in the following manner. First, approximately 1 g (weight $W_{c1}$) of the object to be measured is weighed out in an aluminum dish (weight $W_{c2}$), and the weight of each dish is measured after drying at 130° C. for 2 hours (weight $W_{c3}$). NV can be determined by substituting these values into the following formula:

$$NV[\%] = [(W_{c3} - W_{c2})/W_{c1}] \times 100.$$

In one preferred embodiment of the PSA composition disclosed herein, the composition also contains a tackifying resin. One or more types selected from tackifying resins, for example, rosin resins, rosin derivative resins, petroleum resins, terpene resins, phenol resins, ketone resins, etc., can be used as the tackifying resin. Examples of the aforementioned rosin resins include, for example, gum rosin, wood rosin, and tall oil rosin, as well as stabilized rosins (e.g., a stabilized rosin wherein an aforementioned rosin is disproportionated or hydrogenated), polymer rosins (e.g., a multimer, typically a dimer, of an aforementioned rosin), modified rosins (e.g., an unsaturated modified rosin, etc., modified by an unsaturated acid such as maleic acid, fumaric acid, (meth)acrylic acid, etc.) and the like. Examples of the aforementioned rosin derivative resins include esterified forms of an aforementioned rosin resin, phenol-modified forms of a rosin resin, and esterified forms thereof. Examples of the aforementioned petroleum resins include aliphatic petroleum resins, aromatic petroleum resins, copolymer petroleum resins, alicyclic petroleum resins, and the hydrogenated forms thereof. Examples of the aforementioned terpene resins include α-pinene resins, β-pinene resins, aromatic modified terpene resins, terpene phenol resins, and the like. Examples of the aforementioned ketone resins include ketone resins obtained by condensation of a ketone (e.g., aliphatic ketones such as methylethyl ketone, methylisobutyl ketone, acetophenone, etc.; and alicyclic ketones such as cyclohexanone, methylcyclohexanone, etc.) with a formaldehyde.

Commercially available tackifying resins include the following: "Super Ester KE-802," "NS-100H," "Super Ester E-865," "Super Ester E-865NT," "Super Ester E-650," "Super Ester E-786-60," "Tamanol E-100," "Tamanol E200," "Tamanol 803L," "Pensel D-160," and "Pensel KK" from Arakawa Chemical Industries, Ltd.; and "YS Polyster-S," "YS Polyster-T," and "Mightyace G" from Yasuhara Chemical Co., Ltd., but are not limited thereto. From the standpoint of cohesiveness, etc., in a high temperature environment, a tackifying resin with a softening point, for example, of approximately 140° C. or higher (typically 140 to 180° C.) can be preferably used. By using a tackifying resin with a softening point of approximately 160° C. or higher (typically 160 to 180° C.), a PSA composition can be provided that delivers a PSA sheet with an even higher level of performance. For example, a PSA composition can be provided with an even higher level of balance of cohesiveness and other properties (one or more properties such as adhesiveness, repulsion resistance, recyclability, etc.). One type of such a tackifying resin can be used alone or two or more types thereof can be used in combination.

Such a tackifying resin can be preferably used in the form of an aqueous emulsion wherein the resin is dispersed in water (a tackifying resin emulsion). For example, by mixing aqueous emulsions of polymer L, polymer H, and the aforementioned tackifying resin, a PSA composition containing these components in a desired ratio can be easily prepared. It is preferable to use an emulsion that at least contains no substantial amount of an aromatic hydrocarbon solvent (more preferably, one that contains no substantial amount of an aromatic hydrocarbon solvent or other organic solvent) as the tackifying resin emulsion. A PSA sheet with an even lower amount of TVOC can be provided thereby.

The content of tackifying resin, for example, is preferably approximately 40 parts by weight or less in relation to 100 parts by weight of polymer L based on the nonvolatile component (solid component), and more preferably approximately 30 parts by weight or less. The lower limit of the amount of tackifying resin is not particularly limited herein, and normally an excellent effect can be exhibited by setting the content at approximately 11 part by weight or more (preferably 5 parts by weight or more) in relation to 100 parts by weight of polymer L. In one preferred embodiment of the PSA composition disclosed herein, the content of the tackifying resin is set at approximately 10 to 40 parts by weight (e.g., approximately 15 to 30 parts by weight) in relation to 100 parts by weight of polymer L based on solid content. A PSA composition containing a tackifying resin at such a ratio is preferred because it can form a PSA sheet with an even higher level of performance.

One type of the tackifying resin can be used alone, or two or more types thereof can be used in combination. For example, a tackifying resin with a high softening point (e.g., approximately 140° C. or higher) and a tackifying resin with a lower softening point (e.g., approximately 80 to 120° C.) can be combined and used in a suitable ratio. From the standpoint of cohesiveness in a high temperature environment, approximately 50% or more of the total weight of the tackifying resins to be used is preferably a tackifying resin with a high softening point.

Provided the advantageous effect of the present invention is not markedly diminished thereby, the aforementioned PSA composition can supplementally contain a crosslinking agent selected from crosslinking agents generally used in the field of aqueous PSA compositions, for example, a hydrazine crosslinking agent, epoxy crosslinking agent (e.g., polyethylene glycol diglycidyl ether, etc.), carbodiimide crosslinking agent (which has been hydrophilized), isocyanate (preferably a water-dispersed isocyanate) crosslinking agent, oxazoline crosslinking agent, aziridine crosslinking agent, metal chelate crosslinking agent, active methylol crosslinking agent, active alkoxymethyl crosslinking agent, and silane coupling agent, etc. One type of such crosslinking agents can be used alone, or two or more thereof can be suitably combined and used. Alternatively, the PSA composition may have a formulation wherein no such crosslinking agent is admixed thereinto.

The PSA composition disclosed herein can contain an acid or base (aqueous ammonia, etc.) used to adjust the pH, etc. Examples of other arbitrary components that can be contained in the composition include various additives that are generally used in the field of aqueous PSA compositions such as a viscosity regulator (typically a thickener), leveling agent, plasticizer, bulking agent, pigment, dye or other colorant, stabilizer, preservative, and antioxidant. Such publicly known additives can be used in a conventional manner, and because they do not characterize the present invention, a detailed explanation thereof is omitted herein.

Preferably the PSA composition disclosed herein is configured to have a gel fraction of 30 to 60% (e.g., 30 to 50%). This gel fraction can be adjusted to the aforementioned preferred range by suitably establishing, for example, the copolymer formulations of polymer L and polymer H, polymerization conditions, whether or not a chain transfer agent will be used therein and the amount thereof, whether or not a crosslinking agent will be admixed therein and the amount thereof, etc. If the aforementioned gel fraction is too low, cohesiveness of the PSA is likely to be in adequate, and adhesive residue is likely to remain on the surface of an adherend when the PSA sheet is peeled off. If the gel fraction is too high, impregnation of the porous support such as a nonwoven fabric, etc., will be inadequate, adhesive residue is likely to remain, and the PSA sheet is likely to tear easily, and the adhesiveness (anchoring) to an irregular surface is likely to decrease.

In the present invention, the term "gel fraction of the PSA composition" refers to the weight ratio of the insoluble component remaining after ethyl acetate extraction of the nonvolatile component of the dried PSA composition. The aforementioned gel fraction can be measured by the method described below.

[Gel Fraction Measurement Method]

The PSA composition is applied (typically coated) onto a release liner and dried for 2 min at 100° C. to form a PSA layer on the aforementioned release liner that is approximately 50 μm to 100 μm thick. After this is stored for 3 days at 50° C., a PSA sample of approximately 0.1 g (weight $W_{b1}$mg) is taken from the aforementioned PSA layer, wrapped in a tetrafluoroethylene resin porous membrane (weight $W_{b2}$ mg) with an average pore size of 0.2 μm in the form of a pouch, and the mouth is tied shut with a string (weight $W_{b3}$ mg). This pouch is placed in a 50 mL screw-cap tube (one screw-cap tube is used for 1 pouch), and the screw-cap tube is filled with ethyl acetate. After letting this stand at room temperature (typically 23° C.) for 7 days, the pouch is removed and dried for 2 hours at 130° C., and the weight of the pouch (weight $W_{b4}$mg) is measured. The gel fraction is calculated by inserting the above values into the following formula:

$$\text{Gel fraction}[\%]=[(W_{b4}-W_{b2}-W_{b3})/W_{b1}]\times 100.$$

Preferably a "NITOFLON™ NTF 1122" from Nitto Denko Corp. or an equivalent product will be used for the aforementioned tetrafluoroethylene resin porous membrane.

In accordance with the present invention a PSA sheet featuring a PSA layer formed using any of the PSA compositions disclosed herein is provided. This can be a PSA sheet with a substrate in a mode having such a PSA layer on one or both sides of a sheet-shaped substrate (support), or it can be a PSA sheet without a substrate in a mode wherein the aforementioned PSA layer is retained on a release liner (which can be considered a sheet-like substrate featuring a release surface), etc. Herein, the concept of PSA sheet encompasses items called a PSA tape, PSA label, PSA film, and the like. The aforementioned PSA layer typically will be formed continuously, but is not limited to such a mode, and for example, it can be either a regular or a random pattern of a PSA layer formed in dots, stripes, etc. The PSA sheet provided by the present invention can also be in the form of a roll or a sheet. Alternatively, it can also be a PSA sheet processed into a variety of other shapes.

The PSA sheet disclosed herein can be one having a cross-sectional structure illustrated schematically by FIGS. 1 to 6, for example. Among these, FIGS. 1 and 2 are examples of configurations of a double-sided PSA type of PSA sheet with a substrate. PSA sheet 11 illustrated in FIG. 1 has a PSA layer 2 provided on both sides of a substrate 1, and it has a configuration such that each PSA layer 2 is protected by a release liner 3 wherein at least the PSA layer side thereof is a release side. The PSA sheet 12 illustrated in FIG. 2 provides a PSA layer 2 on both sides of a substrate 1, and it has a configuration such that one of the PSA layers is protected by a release liner 3 wherein both sides thereof are release sides. This type of PSA sheet 12 can be configured such that by winding the PSA sheet 12 upon itself, the PSA layer on the other side comes in contact with the back side of the release liner 3 (which can be a surface rather strongly release-treated in comparison to the front side), and thus the PSA layer on the other side also is protected by the release liner 3.

FIGS. 3 and 4 are examples of configurations of a double-sided PSA sheet without a substrate. The PSA sheet 13 illustrated in FIG. 3 has a configuration such that both sides of a PSA layer 2 without a substrate are each protected by a release liner 3 wherein at least the PSA layer side is a release side. The PSA sheet 14 illustrated in FIG. 4 has a configuration wherein one side of a PSA layer 2 without a substrate is protected by a release liner 3 wherein both sides are release sides, and it is configured so that when it is wound upon itself, the other side of the PSA layer 2 comes in contact with the release liner 3, and thus the other side is also protected by the release liner 3.

FIGS. 5 and 6 are examples of a configuration of a single-sided PSA sheet with a substrate. The PSA sheet 15 illustrated in FIG. 5 has a configuration wherein a PSA layer 2 is provided on one side of a substrate 1, and the front side of that PSA layer 2 (PSA side) is protected by a release liner 3 wherein at least the PSA layer side is a release side. PSA sheet 16 illustrated in FIG. 6 has a configuration wherein a PSA layer 2 is provided on one side of a substrate 1. The other side of the substrate 1 is a release side, and when the PSA sheet 16 is wound on itself, the PSA layer 2 comes in contact with that other side, and thus the front side of that PSA layer (PSA side) is protected by the other side of the substrate 1.

The sheet substrate constituting the PSA sheet can be suitably selected in accordance with the use of the PSA sheet, and examples include a plastic film comprising a resin material such as polyethylene, polypropylene, ethylene-propylene or other polyolefin resin, polyester resin such as polyethylene terephthalate, vinyl acetate resin, polyimide resin, fluorinated resin, polyvinyl chloride resin, cellophane, etc.; rubber sheets comprising natural rubber, butyl rubber, etc.; foam sheets obtained by foaming polyurethane, polychloroprene rubber, polyethylene, etc.; paper such as kraft paper, crepe paper, Japanese paper (washi), etc.; fabric such as cotton fabric, rayon staple fabric, etc.; nonwoven fabric such as cellulose nonwoven fabric, polyester nonwoven fabric, vinylon nonwoven fabric, etc.; metal foil such as aluminum foil, copper foil, etc.; and composites thereof. One or both sides of such a sheet substrate can be surface-treated by coating with a primer, by corona electrical discharge treatment, etc. The thickness of the substrate can be suitably selected depending on the purpose, but in general it will be approximately 10 μm to 500 μm (typically 10 μm to 200 μm).

The release liner (also referred to as a separator) utilized in the construction and/or manufacture of the PSA sheet can be a conventional, publicly known release liner and is not particularly limited herein. For example, a release liner wherein at least one side of a suitable substrate (e.g., glassine paper, kraft paper, clay coated paper, paper coated with a resin film such as polyethylene, etc., paper coated with polyvinyl alcohol and a resin such as an acrylic polymer, etc.) that has been surface-treated by a release agent such as a fluorinated resin, silicone resin, etc., can be preferably used.

When release liners are applied on top of the PSA layers both on one side and on the other side a double-sided PSA sheet, it is preferable to configure the double-sided PSA sheet so that the releasing strength on each side of the release liner (which can constitute one side and the other side of a single release liner) to be applied over the PSA layers is different from the standpoint of increased workability, etc., when a double-sided PSA sheet is used (at the time of application). For example, it is preferable to select a release liner such that the release strength when the release liner is peeled off the PSA layer on the side of the double-sided PSA sheet to be attached first will be less (i.e., will have a lighter release) than the release strength when the release liner is peeled off the PSA layer on the side to be attached next.

The aforementioned PSA layer is formed, for example by applying (typically coating) any of the PSA compositions disclosed herein onto the substrate or release liner and drying the PSA composition. A PSA sheet featuring such a PSA layer can be fabricated by a variety of methods. In the case of a PSA sheet with a substrate, for example the following methods can be used: a method wherein a PSA layer is formed on the substrate by directly applying a PSA composition to the substrate and drying the same, and then applying a release liner on top of the PSA layer; a method wherein a PSA layer formed on top of a release liner is applied to a substrate, the PSA layer is transferred to the substrate and the aforementioned release liner is utilized for the protection of the PSA layer without further processing; and other methods.

The coating of the PSA composition can be carried out using a conventional coater, for example, a rotogravure roll coater, reverse roll coater, case roll coater, deep roll coater, bar coater, knife coater, sprayed coater, and the like.

From the standpoint of increasing the efficiency of removing the aqueous component in the PSA composition and the volatile component such as residual monomer and the like, and for promoting the crosslinking reaction, it is preferable that drying of the composition be carried out by heating. The heating conditions are not particularly limited herein, but preferably a drying temperature of approximately 40° C. to 140° C. (preferably 60° C. to 120° C.) can be utilized. The drying time can be approximately 1 to 5 minutes. The crosslinking reaction can be further promoted by aging (curing) the dried PSA layer under suitable conditions (e.g. an environment at 40° C. or higher (typically 40° C. to 70° C.)).

Although not particularly limited herein, the thickness of the PSA layer (after drying) provided in the PSA sheet disclosed herein can be for example approximately 1 μm to 300 μm (preferably approximately 10 μm to 150 μm).

A double-sided PSA sheet featuring a PSA layer on both sides of a sheet-like substrate can be noted as one preferred embodiment of the PSA sheet disclosed herein. A substrate wherein both one side and the other side are non-releasing can also be used as the aforementioned sheet-like substrate (core).

A nonwoven fabric or other type of fabric or a plastic film (polyester resin film, etc.) can be listed as examples of a sheet like substrate that can preferably be used. As examples of fabrics, woven or nonwoven fabrics used as one type alone or as two or more types in combination (blended fabric) from among fibrous substances such as hemp (Manila hemp, etc.), pulp (wood pulp, etc.) cotton, rayon, vinyl on, acetate fiber, polyvinyl alcohol fiber, polyamide fiber, polyolefin fiber, etc., can be noted. (Natural fibers, synthetic fibers, and semi-synthetic fibers can all be used.) Among these, the use of a nonwoven fabric is preferred. Herein, the term "nonwoven fabric" is a concept referring to a nonwoven fabric for a PSA sheet used mainly in the field of PSA tapes and other PSA sheets, and typically is the kind of nonwoven fabric (sometimes referred to as "paper") that is manufactured using general papermaking equipment.

Preferably the thickness of the nonwoven fiber is approximately 20 μm to 100 μm. A nonwoven fiber with a grammage in the range of approximately 7 to 25 g/m² (e.g. 10 to 25 g/m²) can preferably be used. Furthermore, the bulk density (which can be calculated by dividing the aforementioned grammage by the aforementioned thickness) in the range of approximately 0.25 g/cm³ to 0.5 g/cm³ is preferred.

A nonwoven fabric wherein the tensile strength both in the machine direction (MD) and in the transverse direction (TD) is approximately 5 N/15 mm or more is preferred, a nonwoven fabric with at least an MD tensile strength of 10 N/15 mm or more is more preferred, and one with both an MD and TD tensile strength approximately 10 N/15 mm or more is even more preferred. A nonwoven fabric wherein at least the MD tensile strength is 15 N/15 mm or more is more preferred, and both the MD and TD tensile strength can be approximately 15 N/15 mm or more. A nonwoven fabric satisfying such a tensile strength is suitable for configuring a double-sided PSA sheet with excellent tensile strength.

At the stage of manufacturing the nonwoven fabric, a polymer such as viscose, starch, cationic polymer (e.g. polyamide-amine-epichlorhydrin), etc., can be used for the purpose of increasing the strength (e.g. tensile strength) of the nonwoven fiber. Such a polymer (which can be considered a nonwoven fabric strengthening agent) can be added during the papermaking stage of the nonwoven fabric (stage of concentrating the fibers) or the coating or impregnation thereby can be carried out after the papermaking stage. A nonwoven fabric using such a strengthening agent is suitable for constructing a double-sided PSA sheet with excellent tensile strength. Therefore, the use of a nonwoven fabric incorporating the aforementioned kind of strengthening agent is particularly effective in a double-sided PSA sheet to be used for securing recyclable parts, for example.

The method whereby a PSA layer is provided to one side and the other side of the sheet-like substrate is not limited herein. Normally, any method selected from the following can be preferably used for the aforementioned one side and other side: (1) a method wherein a PSA composition is applied to (typically coated onto) a release liner and dried to form a PSA layer on the release liner, and then the PSA layer is transferred by adhering it to the substrate (hereinafter referred to as transfer method); and (2) a method wherein a PSA composition is applied to (typically coated onto) the substrate and dried (hereinafter referred to as the "direct coating method" or "direct method"). For example, a double-sided PSA sheet can be manufactured by applying the transfer method to both sides of the substrate (transfer-transfer method), or a double-sided PSA sheet can be manufactured by applying the transfer method to one side (typically the side wherein the PSA layer is formed first) of the substrate, and the direct coating method to the other side (transfer-direct method). The aforementioned transfer-direct method is preferably used from the standpoint that a double-sided PSA sheet (e.g., a PSA sheet with high tensile strength) suitable for use in securing parts for recycling (e.g., mounting parts for recycling) is easily obtained thereby. In the manufacture of a PSA sheet by this transfer-direct method, the viscosity of the PSA composition used in the direct method can be lower than the viscosity of the PSA composition used in the transfer method. Greater impregnation of the PSA layer into the substrate and a higher level of PSA properties can be realized thereby.

In the double-sided PSA sheet disclosed herein it is preferable for the tensile strength of the PSA sheet measured both in the machine direction (MD, typically lengthwise in a long PSA sheet), and in the transverse direction (TD) to be approximately 5 N/10 mm or more. A PSA sheet wherein at least the MD tensile strength is approximately 10 N/10 mm or more is more preferred, and PSA sheet wherein both the MD and TD adhesive strength is approximately 10 N/10 mm or more is even more preferred.

To obtain a double-sided PSA sheet satisfying such a tensile strength, the following methods can be used alone or in a suitable combination thereof:

using a nonwoven fabric with a high tensile strength (e.g., a nonwoven fabric having the aforementioned MD and TD tensile strength) as a substrate;

using the direct coating method as the method of forming a PSA layer on at least one side of the substrate;

performing a treatment that adds compressive force in the thickness direction after forming a PSA layer on the substrate (e.g., pressing on a jig at 40° C. or more (typically 40 to 100° C.), preferably 50° C. or more (typically 50 to 90° C.); such a treatment can be preferably carried out using a laminator with the aforementioned roll temperature); and aging by storage for 1 to 7 days, for example, in a heated environment at 40° C. or more (typically 40 to 70° C.). Arranging for even greater impregnation of the PSA layer into the nonwoven fabric thereby is preferred for obtaining a double-sided PSA sheet with even higher tensile strength.

In one preferred embodiment of the PSA sheet disclosed herein, the value of the tensile strength [N/10 mm] when doubled is greater than the value of the adhesive strength [N/20 mm] measured by the method disclosed in the examples below. More specifically, the tensile strength and adhesive strength satisfy this relationship: (tensile strength [N/10 mm]×2)>(adhesive strength [N/20 mm]). A PSA sheet satisfying such a relationship can exhibit excellent tear resistance properties. Therefore, it is most suitable as a PSA sheet to be used for securing recyclable parts. A PSA sheet satisfying the above relationship at least for MD tensile strength is preferred, and a PSA sheet satisfying the above relationship for both MD and TD tensile strength is even more preferred. Furthermore, a PSA sheet satisfying the above relationship for at least PP adhesive strength is preferred, a PSA sheet satisfying the above relationship for both PP and SUS adhesive strength is more preferred, and PSA sheet satisfying the above relationship for PP, SUS, and ABS adhesive strength is even more preferred.

In one preferred embodiment of the PSA sheet (typically double-sided PSA sheet) disclosed herein, the total volatile organic compounds (TVOC) emitted from 1 g of that PSA sheet (comprising a PSA layer and substrate but not including a release liner) when that PSA sheet is heated for 30 min at 80° C. will be 1000 µg or less (hereinafter this is also expressed as "1000 µg/g"). A PSA sheet satisfying such properties can be preferably used in applications with a strong demand for reduction in VOC, for example, home appliances and office automation equipment used indoors, or automobiles, etc., that constitute enclosed spaces. A PSA sheet with a TVOC of 500 µg/g or less is preferred, and one with a TVOC of 300 µg or less is even more preferred. The TVOC of a PSA sheet can be measured, for example, by the methods described in the examples below.

EXAMPLES

Below several examples relating to the present invention are described, but the present invention is by no means limited thereto. Furthermore in the following description the terms "parts" and "%" refer to a weight basis unless specifically stated otherwise.

In the following examples the Mw of polymers was measured by the following method. A nonvolatile component obtained by drying the object to be measured for 2 hours at 130° C. was used as a measurement sample, and the soluble component was extracted by soaking the sample at room temperature (typically 23° C.) in THF for 7 days. Then the soluble component was removed by filtration, and the filtrate was either enriched or diluted as needed (after drying once, it can be re-dissolved in THF) to prepare a THF solution containing a suitable concentration (e.g., approximately 0.1 to 0.3 wt %; 0.2 wt % was used herein) of the THF-soluble component. A filtrate was prepared by filtering the THF solution with a filter having an average pore size of 0.45 µm (test solution for molecular weight measurement), and the weight-average molecular weight on a standard polystyrene basis was determined for that filtrate using a gel permeation chromatography (GPC) apparatus. A Tosoh Corporation model "HLC-8120GPC" was used as the GPC apparatus. The following measurement conditions were used.

| [GPC measurement conditions] | |
|---|---|
| Column: | TSKgel GMH-H(S) |
| Detector: | differential refractometer |
| Eluent: | THF |
| Flow rate: | 0.6 mL/min |
| Measurement temperature: | 40° C. |
| Sample concentration: | 0.2 wt % |
| Sample injection amount: | 100 µL |

In the following examples a double-sided PSA sheet was prepared using each of the nonwoven fabrics shown in Table 1.

Herein the tensile strength of the nonwoven fabrics was measured as follows. Specifically, the nonwoven fabric was aligned so the machine direction corresponded to the lengthwise direction, and a test sample was cut from the nonwoven fabric in the shape of a 15 mm wide band. The test sample was mounted on a tensile strength testing machine (180 mm distance between chucks) and following JIS P 8113, the tensile strength [N/15 mm] of the nonwoven fabric was measured lengthwise (machine direction, MD). Then, the nonwoven fabric was aligned so the transverse direction corresponded to the lengthwise direction, and a test sample was cut from the nonwoven fabric in the shape of a 15 mm wide band. In the same manner the tensile strength [N/15 mm] of the nonwoven fabric was measured along the width (TD, transverse direction). The elongation along the length (MD) and the width (TD) of each woven fabric was also measured according to JIS P 8113.

TABLE 1

| | | Nonwoven fabric | | | |
|---|---|---|---|---|---|
| | | J0 | J1 | J2 | J3 |
| Material | | Manila hemp 100% | Manila hemp 100% | Manila hemp 100% | Wood pulp 100% |
| Grammage [g/m$^2$] | | 14.0 | 18.0 | 23.6 | 11.0 |
| Thickness [µm] | | 45 | 60 | 81 | 30 |
| Bulk density [g/cm$^3$] | | 0.31 | 0.30 | 0.29 | 0.37 |
| Tensile strength | MD | 15.9 | 28.3 | 12.5 | 8.8 |
| [N/15 mm] | TD | 13.8 | 21.5 | 11.4 | 1.5 |
| Elongation [%] | MD | 2.2 | 2.1 | 2.9 | 1.6 |
| | TD | 5.6 | 4.2 | 2.5 | 1.2 |

Example 1

Synthesis of Polymer A1

A reaction vessel equipped with a stirrer, thermometer, reflux condenser, dripping apparatus, and nitrogen inlet port was charged with 184 g of water and 1.18 g of sodium polyoxyethylene laurel sulfate solution as an emulsifier (nonvolatile component 26%, hereinafter simply referred to as "emulsifier solution," expressed as true amount (i.e. amount including volatile component)). Nitrogen replacement was performed while stirring for 1.5 hours at 60° C. under an infusion of nitrogen gas. Then 0.31 g of 2,2'-azobis [N-(2-carboxyethyl)-2-methyl propionamidine]hydrate (Wako Pure Chemical Industries, Ltd., trade name "VA-057") was added as a polymerization initiator. The temperature was held at 60° C., and an emulsion polymerization reaction was carried out by dripping the monomer emulsion into the mixture gradually over 4 hours. For the monomer emulsion, an emulsion of 259 g of 2-ethyl hexyl acrylate (2EHA), 40 g of methyl acrylate (MA), 3.3 g of acrylic acid (AA), 2.3 g of methacrylic acid (MAA), 0.06 g of 3-methacryloxy propyl trimethoxy silane (trade name "KBM-503," Shin-Etsu Chemical Co., Ltd., hereinafter expressed by the above trade name), 0.1 g of dodecane thiol (chain transfer agent), and 22.4 g of emulsifier solution added to 88 g water was used. After dripping of the monomer emulsion was completed, aging was carried out by holding the temperature at 60° C. for 3 hours, and then the heating was discontinued. Next 1.9 g of 10% aqueous hydrogen peroxide was added, and after five minutes 2.28 g of a 20% aqueous solution of ascorbic acid was added, the reaction mixture was cooled to room temperature, and the pH of the liquid was adjusted to 7.2 by adding 10% aqueous ammonia to obtain an emulsion of polymer A1 (emulsion A1e). The NV of emulsion A1e was approximately 51.4%, and the average particle size was approximately 209 nm. The Tg of polymer A1 was −60.22° C., the Mw was about $48.4 \times 10^4$, and the degree of polymerization was approximately 99.8%. The NV, average particle size, Tg, Mw, and degree of polymerization were each determined by the methods disclosed above (the same applies hereinafter).

Example 2

Synthesis of Polymer A2

The same type of reaction vessel as in Example 1 was charged with 120 g of water and 1.29 g of emulsifier solution, nitrogen replacement was carried out for 1.5 hours with stirring at 60° C., and in the same manner as in Example 1, 0.34 g of polymerization initiator was added. The temperature was held at 60° C., and an emulsion polymerization reaction was carried out by dripping the monomer emulsion into the mixture gradually over 4 hours. For the monomer emulsion, an emulsion of 225 g of 2EHA, 98 g of butyl acrylate (BA), 4.5 g of AA, 8.1 g of MAA, 0.04 g of KBM-503, 0.1 g dodecane thiol, and 24.5 g of emulsifier solution added to 119 g of water was used. After dripping of the monomer emulsion was completed, aging was carried out by holding the temperature at 60° C. for 3 hours, and then the heating was discontinued. Next 2.5 g of 10% aqueous hydrogen peroxide was added, and after five minutes 2.5 g of a 20% aqueous solution of ascorbic acid was added, the reaction mixture was cooled to room temperature, and the pH of the liquid was adjusted to 7.2 by adding 10% aqueous ammonia to obtain an emulsion of polymer A2 (emulsion A2e). The NV of emulsion A2e was approximately 56.5%, and the average particle size was approximately 181 nm. The Tg of polymer A2 was −61.12° C., the Mw was about $56.5 \times 10^4$, and the degree of polymerization was approximately 99.7%.

Example 3

Synthesis of Polymer A3

For the monomer emulsion in this example, an emulsion of 225 g of 2EHA, 97 g of butyl acrylate (BA), 4.8 g of AA, 8.1 g of MAA, 0.1 g dodecane thiol, and 24.5 g of emulsifier solution added to 119 g of water was used (i.e., KBM-503 was not included). An emulsion of polymer A3 (emulsion A3e) was obtained in the same manner as in Example 2 with respect to all other points. The NV of emulsion A3e was approximately 56.4%, and the average particle size was approximately 180 nm. The Tg of polymer A3 was −61.06° C., the Mw was about $88.9 \times 10^4$, and the degree of polymerization was approximately 99.5%.

Example 4

Synthesis of Polymer A4

The same type of reaction vessel as in Example 1 was charged with 184 g of water and 1.17 g of emulsifier solution, nitrogen replacement was carried out for 1.5 hours with stirring at 60° C., and in the same manner as in Example 1, 0.31 g of polymerization initiator was added. The temperature was held at 60° C., and an emulsion polymerization reaction was carried out by dripping the monomer emulsion into the mixture gradually over 4 hours. For the monomer emulsion, an emulsion of 259 g of 2EHA, 40 g of MA, 3.3 g of AA, 2.3 g of MAA, 0.06 g of KBM-503, 1.53 g of α-pinene (chain transfer agent), and 22.3 g of emulsifier solution added to 88 g of water was used. After dripping of the monomer emulsion was completed, aging was carried out by holding the temperature at 60° C. for 3 hours, and then the heating was discontinued. Next 2.28 g of 10% aqueous hydrogen peroxide was added, and after five minutes 2.27 g of a 20% aqueous solution of ascorbic acid was added, the reaction mixture was cooled to room temperature and the pH of the liquid was adjusted to 7.2 by adding 10% aqueous ammonia to obtain an emulsion of polymer A4 (emulsion A4e). The NV of emulsion A4e was approximately 51.2%, and the average particle size was approximately 199 nm. The Tg of polymer A4 was −60.22° C., the Mw was about $72.5 \times 10^4$, and the degree of polymerization was approximately 99.1%.

Example 5

Synthesis of Polymer B1

The same type of reaction vessel as in Example 1 was charged with 84 g of water and 1.43 g of emulsifier solution, nitrogen replacement was carried out for 1.5 hours with stirring at 70° C., and in the same manner as in Example 1, 0.19 g of polymerization initiator was added. The temperature was held at 70° C., and an emulsion polymerization reaction was carried out by dripping the monomer emulsion into the mixture gradually over 3 hours. For the monomer emulsion, an emulsion of 180 g of methyl methacrylate (MMA), 2.0 g of AA, 3.5 g of MAA, and 12.9 g of emulsifier solution added to 137 g of water was used. After dripping of the monomer emulsion was completed, aging was carried out by holding the temperature at 70° C. for 3 hours, and then the heating was discontinued. Next 1.4 g of 10% aqueous hydrogen peroxide was added, and after five minutes 1.4 g of a 20% aqueous solution of ascorbic acid was added, the reaction mixture was cooled to room temperature and the pH of the liquid was adjusted to 7.2 by adding 10% aqueous ammonia to obtain an emulsion of polymer B1 (emulsion B1e). The NV of emulsion B1e was approximately 44.0%, and the average particle size was approximately 100 nm. The Tg of polymer B1 was 106.77° C., the Mw was about $88.2 \times 10^4$, and the degree of polymerization was approximately 98.2%.

Example 6

Synthesis of Polymer B2

The same type of reaction vessel as in Example 1 was charged with 184 g of water and 1.65 g of emulsifier solution, nitrogen replacement was carried out for 1.5 hours with stirring at 70° C., and in the same manner as in Example 1, 0.22 g of polymerization initiator was added. The temperature was held at 70° C., and an emulsion polymerization reaction was carried out by dripping the monomer emulsion into the mixture gradually over 3 hours. For the monomer emulsion, an emulsion of 208 g of MMA, 2.4 g of AA, 4.0 g of MAA, 6.7 g of dodecane thiol, and 14.9 g of emulsifier solution added to 78 g of water was used. After dripping of the monomer emulsion was completed, aging was carried out by holding the temperature at 70° C. for 3 hours, and then the heating was discontinued. Next 1.6 g of 10% aqueous hydrogen peroxide was added, and after five minutes 1.6 g of a 20% aqueous solution of ascorbic acid was added, the reaction mixture was cooled to room temperature, and the pH of the liquid was adjusted to 7.2 by adding 10% aqueous ammonia to obtain an emulsion of polymer B2 (emulsion B2e). The NV of emulsion B2e was approximately 44.2%, and the average particle size was approximately 120 nm. The Tg of polymer B2 was 106.75° C., the Mw was about $1.2 \times 10^4$, and the degree of polymerization was approximately 98.3%.

Example 7

Synthesis of Polymer B3

The same type of reaction vessel as in Example 1 was charged with 184 g of water and 1.7 g of emulsifier solution, nitrogen replacement was carried out for 1.5 hours with stirring at 70° C., and in the same manner as in Example 1, 0.22 g of polymerization initiator was added. The temperature was held at 70° C., and an emulsion polymerization reaction was carried out by dripping the monomer emulsion into the mixture gradually over 3 hours. For the monomer emulsion, an emulsion of 221 g of cyclohexyl methacrylate (CHMA), 11.7 g of AA, 1.8 g of dodecane thiol, and 16.1 g of emulsifier solution added to 84 g of water was used. After dripping of the monomer emulsion was completed, aging was carried out by holding the temperature at 70° C. for 3 hours, and then the heating was discontinued. Next 1.6 g of 10% aqueous hydrogen peroxide was added, and after five minutes 1.6 g of a 20% aqueous solution of ascorbic acid was added, the reaction mixture was cooled to room temperature, and the pH of the liquid was adjusted to 7.2 by adding 10% aqueous ammonia to obtain an emulsion of polymer B3 (emulsion B3e). The NV of emulsion B3e was approximately 45.0%, and the average particle size was approximately 141 nm. The Tg of polymer B3 was 67.1° C., the Mw was about $4.1 \times 10^4$, and the degree of polymerization was approximately 98.3%.

Example 8

Synthesis of Polymer S1

The same type of reaction vessel as in Example 1 was charged with 259 g of 2EHA, 40 g of MA, 3.3 g of AA, 2.3 g of MAA, 164 g of ethyl acetate, and as a polymerization initiator, 0.2 g of 2,2'-azobis(2-methylbutyronitrile). After the air in the reaction vessel was replaced with nitrogen gas, the reaction was carried out for 8 hours with stirring at reflux temperature under a nitrogen gas atmosphere. The reflux product was diluted with ethyl acetate so the NV component would be approximately 30% to obtain an ethyl acetate solution of polymer S1 (polymer solution S1s). The Tg of polymer S1 (soluble acrylic copolymer) was −60.22° C., and the Mw was about $63 \times 10^4$.

Example 9

Synthesis of Polymer S2

The same type of reaction vessel as in Example 1 was charged with 93 g of BA, 4.0 g of vinyl acetate (VAc), 3.0 g of AA, 200 g of toluene, and as a polymerization initiator, 0.15 g of 2,2'-azobis isobutyronitrile (AIBN). After the air in the reaction vessel was replaced with nitrogen gas, the reaction was carried out for 6 hours with stirring at 70° C. under a nitrogen gas atmosphere. The reaction product was diluted with toluene so the NV component would be approximately 30% to obtain a toluene solution of polymer S2 (polymer solution S2s). The Tg of polymer S2 (soluble acrylic copolymer) was −48.63° C., and the Mw was about $40 \times 10^4$.

Example 10

Synthesis of Polymer S3

The same type of reaction vessel as in Example 1 was charged with 180 g of MMA, 2.0 g of AA, 3.5 g of MAA, 80 g of ethyl acetate and 0.18 g of the same polymerization initiator as in Example 8. After the air in the reaction vessel was replaced with nitrogen gas, the reaction was carried out for 10 hours with stirring at 70° C. under a nitrogen gas atmosphere. The reaction product was diluted with ethyl acetate so the NV component would be approximately 40% to obtain an ethyl acetate solution of polymer S3 (polymer solution S3s). The Tg of polymer S3 (soluble acrylic copolymer) was 107.43° C., and the Mw was about $42 \times 10^4$.

Tables 2 and 3 present a summary of Examples 1 to 10 described above.

TABLE 2

| | | Example 1 | Example 2 | Example 3 | Example 4 | Example 8 | Example 9 |
|---|---|---|---|---|---|---|---|
| | Polymer | A1 | A2 | A3 | A4 | S1 | S2 |
| Amount [g] | 2EHA | 259 | 225 | 225 | 259 | 259 | |
| | BA | | 98 | 97 | | | 93 |
| | MA | 40 | | | 40 | 40 | |
| | VAc | | | | | | 4 |
| | AA | 3.3 | 4.5 | 4.8 | 3.3 | 3.3 | 3 |
| | MAA | 2.3 | 8.1 | 8.1 | 2.3 | 2.3 | |
| | KBM-503 | 0.06 | 0.04 | | 0.06 | | |
| | Chain transfer agent | | | | | | |
| | Dodecane thiol | 0.1 | 0.1 | 0.1 | | | |
| | α-pinene | | | | 1.53 | | |
| Average particle size [μm] | | 0.209 | 0.181 | 0.180 | 0.199 | — | — |
| NV [%] | | 51.4 | 56.7 | 56.4 | 51.2 | 30 | 30 |
| Mw [×$10^4$] | | 48.4 | 56.5 | 88.9 | 72.5 | 63.0 | 40.0 |

TABLE 2-continued

|  | Example 1 | Example 2 | Example 3 | Example 4 | Example 8 | Example 9 |
|---|---|---|---|---|---|---|
| Degree of Polymerization [%] | 99.8 | 99.7 | 99.5 | 99.1 | — | — |
| Tg [° C.] | −60.22 | −61.12 | −61.06 | −60.22 | −60.22 | −48.63 |

TABLE 3

|  |  | Example 5 | Example 6 | Example 7 | Example 10 |
|---|---|---|---|---|---|
| Polymer |  | B1 | B2 | B3 | S3 |
| Amount [g] | MMA | 180 | 208 |  | 180 |
|  | CHMA |  |  | 221 |  |
|  | AA | 2 | 2.4 | 11.7 | 2 |
|  | MAA | 3.5 | 4.0 |  | 3.5 |
|  | Chain transfer agent |  | 6.7 | 1.8 |  |
| Average particle size [μm] |  | 0.100 | 0.120 | 0.141 | — |
| NV [%] |  | 44.0 | 44.2 | 45.0 | 40 |
| Mw [×10$^4$] |  | 88.2 | 1.2 | 4.08 | 42.0 |
| Degree of Polymerization [%] |  | 98.2 | 98.3 | 98.3 | — |
| Tg [° C.] |  | 106.77 | 106.75 | 67.81 | 107.43 |

Example 11

Fabrication of Double-Sided PSA Sheet

A mixture was prepared of 65 g emulsion A1e obtained in Example 1, 3.8 g of emulsion B1e obtained in Example 5, and 13.39 g of aqueous rosin resin (from Arakawa Chemical Industries, Ltd., trade name "KE-802," softening point 170° C., solid component 50.1%; hereinafter designated by trade name and expressed as true amount). Then the pH was adjusted to 7.2 and the viscosity to 10 Pa·s using 10% aqueous ammonia as the pH regulator and polyacrylic acid (aqueous solution with nonvolatile component of 36%, here and hereinafter) as a thickener, respectively, to obtain aqueous acrylic PSA composition T1. The gel fraction of composition T1 (determined by the measurement method described above, here and hereinafter) was 36.0%.

Furthermore, a mixture was prepared with the same quantities of emulsion A1e, emulsion B1e, and KE-802 as composition T1, and the pH was adjusted to 7.2 with 10% aqueous ammonia and the viscosity to 4 Pa·s with polyacrylic acid to obtain aqueous acrylic PSA composition D1. The gel fraction of composition D1 was 36.3%.

Using these PSA compositions T1 and D1, a double-sided PSA sheet was fabricated in the following sequence. Specifically, two sheets of release liner treated on both sides with a silicone release agent (Kaito Chemical Industry Co., Ltd., trade name "SLB-80WD(V2)") were prepared. PSA composition T1 was applied to one side (first release side) of release liner of one sheet, and dried for 2 minutes at 100° C. to form a PSA layer approximately 60 μm thick on the aforementioned one side. By attaching the release liner with this PSA composition to one side (first side) of nonwoven fabric J0 as a substrate, the transfer method was used to form a first PSA layer on the first side (transfer side).

Next, an amount of PSA composition D1 to form a dried film thickness of 60 μm was directly coated onto the other side (second side) of the aforementioned nonwoven fabric, dried for 2 minutes at 100° C., and thus the direct method was used to form a second PSA layer on the second side (directly coated side). The other side of a second sheet of aforementioned release liner was placed on top of this second PSA layer (second release side). This laminate having the structure of "release liner (first sheet)/first PSA layer/nonwoven fabric/second PSA layer/release liner (second sheet)" was passed once through a laminator with a roll temperature of 80° C. under conditions of 0.3 MPa pressure and a rate of 0.5 m/min (compression treatment) and then aged by storing for 3 days in an oven at 50° C. The double-sided PSA sheets in these examples were prepared in this manner.

Example 12

Fabrication of Double-Sided PSA Sheet

A mixture was prepared of 65 g of emulsion A1e, 3.79 g of emulsion B2e, and the same quantity of KE-802 as in composition T1 (13.39 g), and the pH was adjusted to 7.2 with 10% aqueous ammonia (the same applies hereinbelow) and the viscosity to 10 Pa·s with polyacrylic acid to obtain aqueous acrylic PSA composition T2. The gel fraction of composition T2 was 43.6%.

Furthermore, a mixture was prepared with the same quantities of emulsion A1e, emulsion B2e, and KE-802 as composition T2, and the pH was adjusted to 7.2 with 10% aqueous ammonia and the viscosity to 4 Pa·s with polyacrylic acid, respectively, to obtain aqueous acrylic PSA composition D2. The gel fraction of composition D2 was 43.4%.

A double-sided PSA sheet as in these examples was fabricated in the same manner as Example 11 except that the first PSA layer was formed using PSA composition T2 instead of T1, and the second PSA layer was formed using PSA composition D2 in place of D1.

Example 13

Fabrication of Double-Sided PSA Sheet

A mixture was prepared of 65 g of emulsion A1e, 3.72 g of emulsion B3e, and the same quantity of KE-802 as in composition T1, and the pH was adjusted to 7.2 with 10% aqueous ammonia and the viscosity to 10 Pa·s with polyacrylic acid to obtain aqueous acrylic PSA composition T3. The gel fraction of composition T3 was 39.3%.

Furthermore, a mixture was prepared with the same quantities of emulsion A1e, emulsion B3e, and KE-802 as composition T3, and the pH was adjusted to 7.2 with 10% aqueous ammonia and the viscosity to 4 Pa·s with polyacrylic acid to obtain aqueous acrylic PSA composition D3. The gel fraction of composition D3 was 39.2%.

A double-sided PSA sheet as in these examples was fabricated in the same manner as Example 11 except that PSA compositions T3 and D3 were used instead of PSA compositions T1 and D1, respectively.

Example 14

Fabrication of Double-Sided PSA Sheet

A mixture was prepared of 60 g of emulsion A2e, 3.84 g of emulsion B2e, and 13.58 g of KE-802, and the pH was adjusted to 7.2 and the viscosity to 10 Pa·s to obtain aqueous acrylic PSA composition T4. The gel fraction of composition T4 was 34.0%.

Furthermore, a mixture was prepared with the same quantities of emulsion Ate, emulsion B3e, and KE-802 as composition T4, and the pH was adjusted to 7.2 and the viscosity to 4 Pa·s to obtain aqueous acrylic PSA composition D4. The gel fraction of composition D4 was 34.1%.

A double-sided PSA sheet as in these examples was fabricated in the same manner as Example 11 except that PSA compositions T4 and D4 were used.

Example 15

Fabrication of Double-Sided PSA Sheet

A double-sided PSA sheet was fabricated in the same manner as in Example 14 except that nonwoven fabric J1 was used instead of nonwoven fabric J0, and the coating amounts of compositions T4 and D4 were adjusted so that the thickness of the first PSA layer and second PSA layer was 54 μm each.

Example 16

Fabrication of Double-Sided PSA Sheet

A double-sided PSA sheet was fabricated in the same manner as in Example 14 except that nonwoven fabric J2 was used instead of nonwoven fabric J0, and the coating amounts of compositions T4 and D4 were adjusted so that the thickness of the first PSA layer and second PSA layer was 48 μm each.

Example 17

Fabrication of Double-Sided PSA Sheet

A mixture was prepared of 60 g of emulsion A3e, 1.54 g of emulsion B2e, 13.54 g of KE-802, and 0.82 g of an aqueous solution of polyglycerol-polyglycidyl ether (water-soluble epoxy crosslinking agent) with a 10% NV component. The pH was adjusted to 7.2 and the viscosity to 10 Pa·s to obtain aqueous acrylic PSA composition T7. The gel fraction of composition T7 was 46.1%.

Furthermore, a mixture was prepared with the same quantities of emulsion A3e, emulsion B2e, KE-802, and water-soluble crosslinking agent as composition T7. The pH was adjusted to 7.2 and the viscosity to 4 Pa·s to obtain aqueous acrylic PSA composition D7. The gel fraction of composition D7 was 45.9%.

A double-sided PSA sheet as in these examples was fabricated in the same manner as Example 11 except that PSA compositions T7 and D7 were used.

Example 18

Fabrication of Double-Sided PSA Sheet

A mixture was prepared of 65 g of emulsion A4e, 3.78 g of emulsion B1e, and 13.29 g of KE-802. The pH was adjusted to 7.2 and the viscosity to 10 Pa·s to obtain aqueous acrylic PSA composition T8. The gel fraction of composition T8 was 36.6%. Furthermore, a mixture was prepared with the same quantities of emulsion A4e, emulsion B1e, and KE-802 as composition T8. The pH was adjusted to 7.2 and the viscosity to 4 Pa·s to obtain aqueous acrylic PSA composition D8. The gel fraction of composition D8 was 36.9%. A double-sided PSA sheet as in these examples was fabricated in the same manner as Example 11 except that PSA compositions T8 and D8 were used.

Example 19

Fabrication of Double-Sided PSA Sheet

The pH of emulsion A2e of was adjusted to 7.2 and the viscosity to 10 Pa·s to obtain aqueous acrylic PSA composition T9. The gel fraction of composition T9 was 52.1%.

The pH of emulsion A2e of was adjusted to 7.2 and the viscosity to 4 Pa·s to obtain aqueous acrylic PSA composition D9. The gel fraction was 52.0%.

A double-sided PSA sheet was fabricated in the same manner as Example 11 except that PSA compositions T9 and D9 were used, nonwoven fabric J3 was used as the substrate, and the coating amounts of compositions T9 and D9 were adjusted so that the thickness of the first PSA layer and second PSA layer was 64 μm each. PSA compositions T9 and D9 as in these examples essentially did not contain a component corresponding to polymer H of the present invention, and no tackifying resin was mixed thereinto.

Example 20

Fabrication of Double-Sided PSA Sheet

A mixture was prepared of 60 g of emulsion A2e and 34.0 g of KE-802, and the pH was adjusted to 7.2 and the viscosity to 10 Pa·s to obtain aqueous acrylic PSA composition T10. The gel fraction was 38.0%.

Furthermore, a mixture was prepared with the same quantities of emulsion A2e and KE-802 as composition T10. The pH was adjusted to 7.2 and the viscosity to 4 Pa·s to obtain aqueous acrylic PSA composition D10. The gel fraction was 38.3%.

A double-sided PSA sheet was fabricated in the same manner as in Example 11 except that PSA compositions T10 and D10 were used. PSA compositions T10 and D10 in this example essentially did not contain a component corresponding to polymer H of the present invention. Compositions T10 and D10 did contain 50 parts of rosin resin (i.e., 50 parts KE-802 converted to a solid basis) in relation to 100 parts of polymer A2.

Example 21

Fabrication of Double-Sided PSA Sheet

A mixture of 150 g of polymer solution S1s, 11.3 g of polymer solution S3s, and 9 g of rosin resin (from Arakawa Chemical Industries, Ltd., trade name "Pensel D-160," softening point 160° C.) was prepared and when a solvent-based acrylic polymer composition was prepared, the result was a gel-like mixture. This composition was coated in the same manner as in Example 11, but a uniform coat could not be formed, and it was impossible to fabricate a double-sided PSA sheet wherein the properties could be evaluated.

Example 22

Fabrication of Double-Sided PSA Sheet

A mixture was prepared of 100 g of polymer solution S2s, 12.0 g of rosin resin (from Arakawa Chemical Industries, Ltd., trade name "Pensel D-125," softening point 125° C.), and 0.42 g of isocyanate crosslinking agent (from Nippon Polyurethane Industry Co., Ltd., trade name "Coronate L") to obtain a solvent-based acrylic PSA composition. The gel fraction was 36.0%. A double-sided PSA sheet as in these applications was fabricated in the same manner as in Example 11 except that this composition was used for both the first PSA layer and the second PSA layer.

The double-sided PSA sheets obtained above were subjected to the following evaluation testing. The results, as well as an overview of the constitution of the double-sided PSA sheets as in the examples are shown in Tables 4 and 5. In the tables, "side 1" refers to the results when the first PSA layer was applied to an adherend, and "side 2" refers to the results when the second PSA layer was applied to an adherend.

[Peel Strength]

The release liner covering one side of the double-sided PSA sheet was peeled off, and a 25 μm thick polyethylene terephthalate (PET) film was applied as a base. The backed PSA sheet was cut into sizes of 20 mm wide by 100 mm long to prepare test pieces. The release liner was peeled off the other side of an aforementioned test piece, and the test piece was pressure bonded to an adherend by a single back-and-forth pass with a 2 kg roller. Twenty-minutes after attachment (pressure bonding), the peel strength (N/20 mm wide) was measured following MS Z0237 at a temperature of 23° C. and relative humidity of 50% using a tensile strength testing machine with a pull rate of 300 mm/min and a pull angle of 180°.

Tables 4 and 5 show the results when the aforementioned peel strength was measured using an SUS304 stainless steel sheet as an adherend as "SUS adhesive strength," the results using a polypropylene resin sheet (PP sheet, a Shin Kobe Electric Machinery Co., Ltd., No. "PP-N-AN" sheet was used) as "PP adhesive strength," and the results when acrylonitrile-butadiene-styrene copolymer resin sheet (ABS sheet, a Shin Kobe Electric Machinery Co., Ltd., No. "ABS-N-WN" sheet was used) as "ABS adhesive strength."

[80° C. Holding Strength]

The release liner covering one side of a double-sided PSA sheet was peeled off the double-sided PSA sheet, and a 25 μm thick PET film was applied as a base. The backed PSA sheet was cut into sizes of 10 mm wide by 100 mm long to prepare test pieces. The release liner was peeled off the other side of the above test piece, and the test piece was compression bonded by a single back-and-forth pass with a 2 kg roller onto a bakelite sheet as an adherend to make a bonding area of 10 mm wide by 20 mm long. After the test piece bonded to the adherend in such a manner was left suspended for 30 min in an 80° C. environment, a 500 g weight was attached to the free end of the test piece, and following JIS Z0237, after the piece was left for 1 hour in the 80° C. environment with the weight attached, the displacement distance (mm) of the test piece was measured.

[Curved Surface Adhesion Test]

A double-sided PSA sheet was cut to have the same surface area (10 mm wide by 90 mm long) as a 10 mm wide by 90 mm long by 0.5 mm thick piece of aluminum. The release liner covering the second PSA layer (directly coated side) was peeled off, and the test piece was aligned and attached to the aluminum. This was wrapped around a 40 mm OD rod (with the aluminum side on the inside) and pressed down for approximately 10 sec to fabricate a curved test piece. The release liner was peeled off the first side (transfer side) of the test piece, and compression bonded to a polypropylene sheet using a laminator. This was left for 24 hours in an environment at 23° C., and after it was heated for 2 hours at 70° C., the gap height (mm) that the edge of the test piece had risen off the surface of the polypropylene sheet was measured. The curved surface adhesion test results shown in Tables 4 and 5 are average values for the gap height. When the average value is 5 mm or higher, it is assumed that substantially curved surface adhesion is not sufficient.

[Foam Repulsion Resistance Test]

The release liner covering the second PSA layer (directly coated side) of a double-sided PSA sheet was peeled off, and applied with a laminator to a 10 mm thick urethane foam (Inoac Corporation, trade name "ECS foam"). Test pieces were fabricated by cutting the above into 10 mm wide by 50 mm long slices. The release liner was peeled off the first PSA layer (transfer side) of a test piece, and the test piece was compression bonded by a single back-and-forth pass with a 2 kg roller onto one surface of a 2 mm thick ABS sheet such that the bonded surface area was 10 mm wide by 10 mm long. The remaining part of the test piece (10 mm wide by 40 mm long) was bent approximately 180° and attached to the other side of the ABS sheet. This was left for 24 hours in a 23° C. environment, and after it was placed in a 70° C. environment for 2 hours, the height (mm) that the edge of the test piece had risen off the aforementioned one surface of the ABS sheet (side with the bonded surface of 10 mm wide by 10 mm long) was measured. If the gap height was 5 mm or more, it was concluded that the foam repulsion resistance was inadequate for practical use. In Tables 4 and 5 the term "fully open" indicates that the edge of the test piece had risen so far that the aforementioned bent portion had opened more than 90°.

[PSA Sheet Strength]

A double-sided PSA sheet was cut in 10 mm wide bands such that the machine direction of the nonwoven fabric substrate corresponded to the lengthwise direction, and the release liners were removed from both PSA layers. These pieces were placed in a tensile strength test machine, and under measurement conditions of 23° C. and 50% relative humidity, the maximum strength observed when pulled under conditions of a distance between chucks of 100 mm and a pull rate of 300 mm/min was used as the tensile strength [N/10 mm] in the vertical direction (machine direction, expressed in the tables as "MD") of the PSA sheet. The maximum tensile strength observed under the same conditions for a test piece wherein the double-sided PSA sheet was cut into 10 mm wide bands such that the transverse direction of the nonwoven fabric corresponded to the lengthwise direction was used as the tensile strength [N/10 mm] of the horizontal direction of the PSA sheet (transverse direction, expressed in the tables as "TD").

[Recyclability]

The release liner covering the second PSA layer (directly coated layer) of a double-sided PSA sheet was applied to a nonwoven fabric (from Japan Vilene Co., Ltd., trade name "Vi-Black SA-25NK"). This was cut into 20 mm wide by 100 mm long test pieces. The release liner was peeled off the first PSA layer (transfer side) of a test piece, and the test piece was compression bonded by a single back-and-forth pass with a 2 kg roller to one side of a 2 mm thick polystyrene resin sheet (PS sheet). After this was stored for 14 days in a hot air circulating dryer at 70° C., it was removed from the dryer and let stand for at least 24 hours in an environment at 23° C. and 50% relative humidity. Then using a tensile strength test machine under measurement conditions of 23° C. and 50% relative humidity, the test piece was peeled off rapidly at a pull rate of 30 m/min and a release angle of 180°. The condition after removal was observed visually, and scored as follows:
Good recyclability: Peeled off the PS sheet (adherend) without adhesive residue and tearing of the sheet;
Poor recyclability: At least part of the test piece remained on the surface of the PS sheet due to adhesive residue and sheet tearing.

[Measurement of Total Volatile Organic Compounds (TVOC)]

A double-sided PSA sheet was cut into a desired size (herein, a size with a surface area approximately 5 cm$^2$), the release liner covering one of the PSA layers was peeled off and attached to aluminum foil. The release liner was peeled off the other PSA layer and exposed to prepare a test piece. The test piece was placed in a 20 mL vial and the vial was sealed. Next, the vial was heated for 30 min at 80° C., and 1.0 mL of hot gas therefrom (sample gas) was injected into a gas chromatograph (GC) using a headspace autosampler (HSS). Based on the resulting gas chromatogram, the amount of gas emitted from the test piece was determined as an amount converted to n-decane. The n-decane converted value was determined by considering the detected strength of the emitted gas obtained by GC/mass spectrometry to be the detected strength of n-decane and utilizing an n-decane calibration curve prepared beforehand.

A Hewlett Packard model 7694 was used as the aforementioned HSS under the following conditions:

| | |
|---|---|
| Oven temperature: | 80° C. |
| Heating time: | 30 min |
| Pressurization time: | 0.12 min |
| Loop fill time: | 0.12 min |
| Loop equilibration time: | 0.05 min |
| Inject time: | 3 min |
| Sample loop temperature: | 160° C. |
| Transfer line temperature: | 200° C. |

A Hewlett Packard model 6890N was used for gas chromatography (GC) under the following conditions:

| | |
|---|---|
| Column: | DB-FFAP, 30 m × 0.535 mm φ, id × 1.0 mμ film thickness |
| Column temperature: | 40° C. (0 min)-<+10° C./min>-90° C. (0 min)-<+20° C./min>-250° C. (2 min) [This means the temperature was raised from 40° C. to 90° C. at a rate of 10° C./min, then after it was raised to 250° C. at a rate of 10° C./min, it was held at 250° C. for 2 min.] |
| Column pressure: | 24.3 kPa (constant flow mode) |
| Carrier gas: | He (5.0 mL/min) |
| Injection port: | Split (split ratio 12:1) |
| Injection port temperature: | 250° C. |
| Detector: | FID |
| Detection temperature: | 250° C. |

TABLE 4

| | | Example 11 | Example 12 | Example 13 | Example 14 | Example 15 | Example 16 | Example 17 | Example 18 |
|---|---|---|---|---|---|---|---|---|---|
| Ingredients [parts] | A1e | 65 | 65 | 65 | | | | | |
| | A2e | | | | 60 | 65 | 65 | | |
| | A3e | | | | | | | 60 | |
| | A4e | | | | | | | | 65 |
| | B1e | 3.80 | | | | | | 1.54 | 3.78 |
| | B2e | | 3.79 | | 3.84 | 3.79 | 3.79 | | |
| | B3e | | | 3.72 | | | | | |
| | KE-802 | 13.39 | 13.39 | 13.39 | 13.58 | 13.39 | 13.39 | 13.54 | 13.29 |
| Gel fraction [%] | Side 1 | 36.0 | 43.6 | 39.3 | 34.0 | 34.0 | 34.0 | 46.1 | 36.6 |
| | Side 2 | 36.3 | 43.4 | 39.2 | 34.1 | 34.1 | 34.1 | 45.9 | 36.9 |
| Nonwoven fabric | | J0 | J0 | J0 | J0 | J1 | J2 | J0 | J0 |
| PSA sheet thickness [μm] | | 166 | 157 | 170 | 163 | 171 | 164 | 161 | 164 |
| SUS adhesive strength [N/20 mm] | Side 1 | 15.8 | 18.0 | 17.3 | 13.5 | 14.0 | 13.5 | 14.6 | 15.2 |
| | Side 2 | 13.3 | 14.8 | 15.3 | 10.3 | 16.5 | 14.5 | 14.7 | 13.7 |
| PP adhesive strength [N/20 mm] | Side 1 | 14.3 | 15.5 | 14.3 | 12.5 | 12.0 | 11.3 | 14.0 | 13.8 |
| | Side 2 | 13.5 | 13.8 | 13.3 | 10.0 | 14.5 | 13.0 | 13.5 | 13.2 |
| ABS adhesive strength [N/20 mm] | Side 1 | 19.8 | 27.0 | 19.5 | 21.8 | 17.5 | 18.8 | 16.1 | 17.3 |
| | Side 2 | 15.8 | 21.3 | 16.3 | 18.5 | 18.8 | 21.5 | 19.1 | 15.4 |
| 80° C. holding strength [mm] | Side 1 | 1.6 | 0.9 | 1.3 | 1.5 | 0.8 | 0.5 | 0.7 | 1.0 |
| | Side 2 | 1.5 | 0.9 | 1.0 | 1.8 | 1.0 | 0.6 | 0.9 | 0.9 |
| Repulsion resistance [mm] | | | | | | | | | |
| Curved surface adhesion test | | 1.2 | 1.1 | 1.1 | 0.9 | 1.2 | 1.3 | 1.2 | 1.6 |
| Foam repulsion resistance test | | 0.3 | 0.5 | 0.3 | 1.2 | 1.1 | 0.8 | 0.8 | 0.9 |
| PSA sheet strength [N/10 mm] | MD | 12.8 | 13.2 | 12.9 | 12.5 | 17.9 | 24.6 | 13.2 | 13.2 |
| | TD | 11.2 | 11.3 | 10.3 | 10.9 | 12.1 | 18.7 | 11.5 | 11.9 |
| Recyclability | | good | good | good | good | good | good | good | good |
| TVOC [μg/g] | | 103 | 130 | 100 | 150 | 200 | 170 | 155 | 133 |

TABLE 5

|  |  | Example 19 | Example 20 | Example 21 | Example 22 |
|---|---|---|---|---|---|
| Ingredients [parts] | A1e |  |  |  |  |
|  | A2e | 60 | 60 |  |  |
|  | S1s |  |  | 150 |  |
|  | S2s |  |  |  | 100 |
|  | S3s |  |  | 11.3 |  |
|  | Tackifying resin |  |  |  |  |
|  | KE-802 |  | 34.0 |  |  |
|  | Pensel D-160 |  |  | 9 |  |
|  | Pensel D-125 |  |  |  | 12 |
| Gel fraction [%] | Side 1 | 52.1 | 38.0 |  | 36.0 |
|  | Side 2 | 52.0 | 38.3 |  | 36.0 |
| Nonwoven fabric |  | J3 | J0 | J0 | J2 |
| PSA sheet thickness [µm] |  | 166 | 174 |  | 170 |
| SUS adhesive strength [N/20 mm] | Side 1 | 9.5 | 16.3 |  | 16.5 |
|  | Side 2 | 11.1 | 16.0 |  | 15.3 |
| PP adhesive strength [N/20 mm] | Side 1 | 7.2 | 12.0 |  | 14.0 |
|  | Side 2 | 7.7 | 11.5 |  | 13.0 |
| ABS adhesive strength [N/20 mm] | Side 1 | 13.2 | 23.8 |  | 19.0 |
|  | Side 2 | 14.8 | 23.0 |  | 18.5 |
| 80° C. holding strength [mm] | Side 1 | 0.6 | 0.6 |  | 0.7 |
|  | Side 2 | 0.7 | 0.7 |  | 0.7 |
| Repulsion resistance [mm] |  |  |  |  |  |
| Curved surface adhesion test |  | 13.0 | 3.8 |  | 1.9 |
| Foam repulsion resistance test |  | 1.0 | fully open |  | 1.0 |
| PSA sheet strength [N/10 mm] | MD | 11.2 | 12.1 |  | 24.6 |
|  | TD | 3.8 | 11.2 |  | 19.8 |
| Recyclability |  | poor | good |  | good |
| TVOC [µg/g] |  | 110 | 330 |  | 2000 |

As shown in Table 4, the double-sided PSA sheets using the aqueous PSA composition according to the present invention (Examples 11 to 18) realized a high level of adhesive strength of 10 N/20 mm or higher in relation to all adherends (SUS, PP and ABS) in the PSA layers formed both by the transfer method and by the direct method. Furthermore, the PSA sheets according to the present invention demonstrated excellent holding power in a high temperature (80° C.) environment in the PSA layers formed both by the transfer method and by the direct method. Additionally, it was found that the PSA sheets in Examples 11 to 18 exhibited excellent repulsion resistance.

Moreover, the double-sided PSA sheets according to Examples 11 to 18 all demonstrated excellent recyclability. These double-sided PSA sheets had a tensile strength of 10 N/10 mm or higher in both the MD and TD directions. The double-sided PSA sheets of Examples 11 to 18 all had a TVOC of 500 µg/g or less (more specifically 200 µg/g or less).

On the other hand, as shown in Table 5, the PSA sheets of Examples 19 and 20 are formulations having the same polymer A2 as in Example 14 as a base polymer, but unlike Example 14, because they do not contain an acrylic copolymer with a high Tg (polymer B2 in this case) a balance of the PSA performance properties is lacking. In other words, in Example 19, which does not contain a tackifying resin, the adhesive strength (particularly, the adhesive strength in relation to a resin with low polarity such as PP) was far below 10 N/20 mm, and recyclability was poor. In Example 20 a tackifying resin was included to obtain an adhesive strength comparable to that of Example 14. In this example, however, an acrylic copolymer with a high Tg was not used, so it was necessary to include at least twice as much tackifying resin as in Example 14 to realize an equivalent adhesive strength. Because such a large amount of tackifying resin was contained therein, the foam repulsion resistance of the PSA sheet of Example 20 was conspicuously poor.

In Examples 21 and 22 solvent-based PSA compositions were produced and double-sided PSA sheets utilizing the same were evaluated as reference examples. In Example 21 a gelling problem occurred during manufacturing, and in Example 22 the TVOC was conspicuously large because toluene was used.

Specific examples of the present invention have been described in detail above, but these are merely examples and the claims of the present invention are by no means limited thereto. The technology disclosed in the claims encompasses a variety of modifications and changes to the specific examples illustrated above.

What is claimed is:

1. A water-dispersed pressure-sensitive adhesive composition comprising
   (a) as a base polymer thereof a water-dispersed acrylic copolymer (polymer L) with a glass transition temperature (Tg) in the range of −70° C. to −50° C., and
   (b) 0.5 to 15 parts by weight of a water-dispersed acrylic copolymer (polymer H) with a Tg in the range of 30° C. to 120° C. in relation to 100 parts by weight of the polymer L based on solid content,
   wherein the polymer L is obtained by polymerization of a monomer starting material comprising:
   60 wt % or more of an alkyl (meth)acrylate with a $C_8$-$C_{12}$ alkyl group (monomer la); and
   0.5 to 10 wt % of a radical polymerizable monomer with a carboxyl group (monomer lb).

2. The composition according to claim 1, wherein the polymer H is obtained by polymerization of a monomer starting material containing a radical polymerizable monomer with a carboxyl group (monomer hb) in an amount of 0.5 to 10 wt %.

3. The composition according to claim 1, wherein the polymer H is obtained by polymerization of a monomer starting material containing 50 wt % or more of one or more types of monomer (monomer ha) selected from alkyl (meth)acrylates and cycloalkyl (meth)acrylates having a homopolymer Tg of 60° C. to 120° C.

4. The composition according to claim 1, wherein the polymer H has a weight-average molecular weight of $0.5 \times 10^4$ to $200 \times 10^4$.

5. The composition according to claim 1, wherein the polymer H is configured as an aqueous emulsion with an average particle size of 0.05 µm to 0.8 µm.

6. The composition according to claim 1, wherein the monomer lb contains acrylic acid and methacrylic acid at an acrylic acid/methacrylic acid weight ratio of 0.1 to 10.

7. The composition according to claim 1, further comprising a tackifying resin at 10 to 40 parts by weight in relation to 100 parts by weight of the polymer L based on solid content.

8. The composition according to claim 1, wherein the composition has a gel fraction of 30% to 60%.

9. A pressure-sensitive adhesive sheet comprising a pressure-sensitive adhesive layer formed by the composition according to claim 1.

10. The pressure-sensitive adhesive sheet according to claim 9, configured as a double-sided pressure-sensitive adhesive sheet comprising the adhesive layer on each side of a substrate sheet.

11. The pressure-sensitive adhesive sheet according to claim 10, wherein the substrate is of a nonwoven fabric, and wherein the pressure-sensitive adhesive sheet has a tensile strength of 10 N/10 mm or greater measured in both a machine direction and a transverse direction of the nonwoven fabric.

12. The pressure-sensitive adhesive sheet according to claim 9, wherein the pressure-sensitive adhesive sheet is adhered to recyclable parts.

13. The pressure-sensitive adhesive sheet according to claim 9, wherein a total amount of volatile organic compounds (TVOC) emitted from the adhesive sheet when heated for 30 min at 80° C. is 1000 µg or less per gram of the adhesive sheet.

14. The composition according to claim 1, wherein an amount of the polymer H is 2 to 5 parts by weight in relation to 100 parts by weight of the polymer L based on solid content.

15. The composition according to claim 7, wherein a softening point of the tackifying resin is 140° C. or higher.

16. The composition according to claim 1, wherein the polymer H has a weight-average molecular weight of $4.08 \times 10^4$ to $200 \times 10^4$.

17. The composition according to claim 1, wherein a glass transition temperature of the polymer H is 70° C. to 120° C.

18. The composition according to claim 1, wherein the polymer L and the polymer H are obtained by emulsion polymerization using at least one emulsifier selected from the group consisting of sodium lauryl sulfate, ammonium lauryl sulfate, sodium dodecylbenzene sulfonate, sodium polyoxyethylene alkyl ether sulfate, ammonium polyoxyethylene alkylphenyl ether sulfate, sodium polyoxyethylene alkylphenyl ether sulfate, polyoxyethylene alkyl ether, and polyoxyethylene alkylphenyl ether.

19. A water-dispersed pressure-sensitive adhesive composition comprising
  (a) as a base polymer thereof a water-dispersed acrylic copolymer (polymer L) with a glass transition temperature (Tg) in the range of −70° C. to −50° C., and
  (b) 0.5 to 15 parts by weight of a water-dispersed acrylic copolymer (polymer H) with a Tg in the range of 30° C. to 120° C. in relation to 100 parts by weight of the polymer L based on solid content,
wherein the polymer L is obtained by polymerization of a monomer starting material comprising:
60 wt % or more of an alkyl (meth)acrylate with a $C_8$-$C_{12}$ alkyl group (monomer la), and
0.5 to 10 wt % of a radical polymerizable monomer with a carboxyl group (monomer lb),
wherein the composition has a gel fraction of 30% to 60%, and
wherein a total amount of volatile organic compounds (TVOC) emitted from the adhesive sheet when heated for 30 min at 80° C. is 1000 µg or less per gram of the adhesive sheet.

* * * * *